United States Patent
Iyer et al.

(10) Patent No.: US 9,552,253 B2
(45) Date of Patent: Jan. 24, 2017

(54) PROBABILISTIC FLIT ERROR CHECKING

(71) Applicant: Intel Corporation, Santa Clara, CA (US)

(72) Inventors: Venkatraman Iyer, Round Rock, TX (US); Robert G. Blankenship, Tacoma, WA (US); Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 14/495,797

(22) Filed: Sep. 24, 2014

(65) Prior Publication Data

US 2016/0085619 A1 Mar. 24, 2016

(51) Int. Cl.
| | |
|---|---|
| *G06F 11/00* | (2006.01) |
| *G06F 11/10* | (2006.01) |
| *H04L 1/00* | (2006.01) |
| *G06F 13/42* | (2006.01) |

(52) U.S. Cl.
CPC ....... *G06F 11/1004* (2013.01); *G06F 13/4221* (2013.01); *H04L 1/0041* (2013.01); *H04L 1/0045* (2013.01); *H04L 1/0061* (2013.01); *H04L 2001/0096* (2013.01)

(58) Field of Classification Search
None
See application file for complete search history.

(56) References Cited

U.S. PATENT DOCUMENTS

| | | | | |
|---|---|---|---|---|
| 8,204,067 | B2 * | 6/2012 | Cherukuri | G06F 13/4009 370/402 |
| 2005/0078559 | A1 * | 4/2005 | Herring | G04G 5/002 368/46 |
| 2005/0081080 | A1 * | 4/2005 | Bender | H04L 41/0668 714/2 |
| 2005/0204193 | A1 * | 9/2005 | Mannava | G06F 11/0745 714/18 |
| 2007/0226596 | A1 * | 9/2007 | Safranek | G06F 1/32 714/781 |
| 2013/0007491 | A1 * | 1/2013 | Iyer | G06F 1/3206 713/321 |
| 2015/0163170 | A1 * | 6/2015 | Birrittella | H04L 69/22 370/419 |
| 2015/0278040 | A1 * | 10/2015 | Sikkink | G06F 11/2002 714/5.1 |

* cited by examiner

*Primary Examiner* — Daniel McMahon
(74) *Attorney, Agent, or Firm* — Patent Capital Group

(57) ABSTRACT

A bit error in a flit transmitted over a link is determined to affect one or more particular bits of the flit based on a syndrome value associated with a cyclic redundancy check (CRC) value of the flit. The link includes a plurality of lanes. It is determined that the one or more particular bits were sent over one or more particular lanes of the link. The bit error is associated with the one or more particular lanes based on determining that the affected bits were transmitted over the particular lanes.

20 Claims, 18 Drawing Sheets

|     | L7  | L6  | L5  | L4  | L3  | L2  | L1  | L0  |
|-----|-----|-----|-----|-----|-----|-----|-----|-----|
| UI0 | 191 | 167 | 143 | 119 | 95  | 71  | 47  | 23  |
| UI1 | 190 | 166 | 142 | 118 | 94  | 70  | 46  | 22  |
| UI2 | 189 | 165 | 141 | 117 | 93  | 69  | 45  | 21  |
| UI3 | 188 | 164 | 140 | 116 | 92  | 68  | 44  | 20  |
| UI4 | 187 | 163 | 139 | 115 | 91  | 67  | 43  | 19  |
| UI5 | 186 | 162 | 138 | 114 | 90  | 66  | 42  | 18  |
| UI6 | 185 | 161 | 137 | 113 | 89  | 65  | 41  | 17  |
| UI7 | 184 | 160 | 136 | 112 | 88  | 64  | 40  | 16  |
| UI8 | 183 | 159 | 135 | 111 | 87  | 63  | 39  | 15  |
| UI9 | 182 | 158 | 134 | 110 | 86  | 62  | 38  | 14  |
| UI10| 181 | 157 | 133 | 109 | 85  | 61  | 37  | 13  |
| UI11| 180 | 156 | 132 | 108 | 84  | 60  | 36  | 12  |
| UI12| 179 | 155 | 131 | 107 | 83  | 59  | 35  | 11  |
| UI13| 178 | 154 | 130 | 106 | 82  | 58  | 34  | 10  |
| UI14| 177 | 153 | 129 | 105 | 81  | 57  | 33  | 9   |
| UI15| 176 | 152 | 128 | 104 | 80  | 56  | 32  | 8   |
| UI16| 175 | 151 | 127 | 103 | 79  | 55  | 31  | 7   |
| UI17| 174 | 150 | 126 | 102 | 78  | 54  | 30  | 6   |
| UI18| 173 | 149 | 125 | 101 | 77  | 53  | 29  | 5   |
| UI19| 172 | 148 | 124 | 100 | 76  | 52  | 28  | 4   |
| UI20| 171 | 147 | 123 | 99  | 75  | 51  | 27  | 3   |
| UI21| 170 | 146 | 122 | 98  | 74  | 50  | 26  | 2   |
| UI22| 169 | 145 | 121 | 97  | 73  | 49  | 25  | 1   |
| UI23| 168 | 144 | 120 | 96  | 72  | 48  | 24  | 0   |

*FIG. 8*

| UI | 7 | 6 | 5 | 4 | 3 | 2 | 1 | 0 |
|---|---|---|---|---|---|---|---|---|
| 0,1,2,3 | 47 | 41 | 35 | 29 | 23 | 17 | 11 | 5 |
| 4,5,6,7 | 46 | 40 | 34 | 28 | 22 | 16 | 10 | 4 |
| 8,9,10,11 | 45 | 39 | 33 | 27 | 21 | 15 | 9 | 3 |
| 12,13,14,15 | 44 | 38 | 32 | 26 | 20 | 14 | 8 | 2 |
| 16,17,18,19 | 43 | 37 | 31 | 25 | 19 | 13 | 7 | 1 |
| 20,21,22,23 | 42 | 36 | 30 | 24 | 18 | 12 | 6 | 0 |

*FIG. 9*

| UI | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0, 1, 2, 3 | 0 | 1 | 2 | 3 | 9 | 12 | 14 | 17 | 19 | 22 | 24 | 27 | 29 | 32 | 34 | 37 | 39 | 42 | 44 | 47 |
| 4, 5, 6, 7 | 1 | 3 | 5 | 7 | 8 | 11 | 13 | 16 | 18 | 21 | 23 | 26 | 28 | 31 | 33 | 36 | 38 | 41 | 43 | 46 |
| 8, 9, 10, 11 | 0 | 2 | 4 | 6 | 12 | 10 | 16 | 15 | 20 | 20 | 25 | 25 | 30 | 30 | 35 | 35 | 40 | 40 | 45 | 45 |
| 12, 13, 14, 15 | 2 | 4 | 7 | 9 | 11 | 13 | 15 | 17 | 19 | 22 | 24 | 27 | 29 | 32 | 34 | 37 | 39 | 42 | 44 | 47 |
| 16, 17, 18, 19 | 1 | 3 | 6 | 8 | 10 | 14 | 14 | 18 | 18 | 21 | 23 | 26 | 28 | 31 | 33 | 36 | 38 | 41 | 43 | 46 |
| 20, 21, 22, 23 | 1 | 4 | 6 | 9 | 11 | 13 | 16 | 19 | 21 | 23 | 25 | 27 | 29 | 32 | 34 | 37 | 39 | 42 | 44 | 47 |
| 24, 25, 26, 27 | 0 | 3 | 5 | 8 | 10 | 12 | 15 | 18 | 20 | 22 | 24 | 26 | 28 | 31 | 33 | 36 | 38 | 41 | 43 | 46 |
| 28, 29, 30, 31 | 2 | 4 | 7 | 9 | 12 | 14 | 17 | 19 | 22 | 24 | 27 | 29 | 32 | 33 | 36 | 35 | 40 | 40 | 45 | 45 |
| 32, 33, 34, 35 | 1 | 3 | 6 | 8 | 11 | 13 | 16 | 18 | 21 | 23 | 26 | 28 | 31 | 34 | 35 | 37 | 38 | 42 | 44 | 47 |
| 36, 37, 38, 39 | 0 | 4 | 5 | 9 | 10 | 14 | 15 | 19 | 20 | 24 | 25 | 29 | 30 | 34 | 35 | 39 | 38 | 41 | 43 | 46 |
| 40, 41, 42, 43 | 1 | 3 | 6 | 8 | 11 | 13 | 16 | 18 | 21 | 23 | 26 | 28 | 31 | 33 | 36 | 38 | 41 | 43 | 45 | 47 |
| 44, 45, 46, 47 | 0 | 2 | 5 | 7 | 10 | 12 | 15 | 17 | 20 | 22 | 25 | 27 | 30 | 32 | 35 | 37 | 40 | 42 | 44 | 46 |

*FIG. 10*

| Lane Rv=1 | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Lane Rv=0 | 19 | 18 | 17 | 16 | 15 | 14 | 13 | 12 | 11 | 10 | 9 | 8 | 7 | 6 | 5 | 4 | 3 | 2 | 1 | 0 |
| x20 ph0 MSB | 191 | 179 | 171 | 159 | 151 | 139 | 131 | 119 | 111 | 99 | 91 | 79 | 71 | 59 | 51 | 39 | 31 | 23 | 15 | 7 |
| x20 ph0 LSB | 180 | 172 | 160 | 152 | 140 | 132 | 120 | 112 | 100 | 92 | 80 | 72 | 60 | 52 | 40 | 32 | 24 | 16 | 8 | 0 |
|  | 3 | 2 | 3 | 2 | 3 | 2 | 3 | 2 | 3 | 2 | 3 | 2 | 3 | 2 | 3 | 2 | 3 | 2 | 2 | 2 |
| x20 ph1 MSB | 191 | 183 | 171 | 163 | 151 | 143 | 131 | 123 | 111 | 103 | 91 | 83 | 71 | 67 | 55 | 51 | 39 | 31 | 19 | 11 |
| x20 ph1 LSB | 184 | 172 | 164 | 152 | 144 | 132 | 124 | 112 | 104 | 92 | 84 | 72 | 68 | 56 | 52 | 40 | 32 | 20 | 12 | 0 |
|  | 2 | 3 | 2 | 3 | 2 | 3 | 2 | 3 | 2 | 3 | 2 | 3 | 1 | 3 | 1 | 3 | 2 | 3 | 2 | 3 |
| x20 ph2 MSB | 191 | 179 | 171 | 159 | 151 | 139 | 131 | 119 | 111 | 103 | 95 | 87 | 79 | 67 | 59 | 47 | 39 | 27 | 19 | 7 |
| x20 ph2 LSB | 180 | 172 | 160 | 152 | 140 | 132 | 120 | 112 | 104 | 96 | 88 | 80 | 68 | 60 | 48 | 40 | 28 | 20 | 8 | 0 |
|  | 3 | 2 | 3 | 2 | 3 | 2 | 3 | 2 | 2 | 3 | 2 | 2 | 3 | 2 | 3 | 2 | 3 | 2 | 3 | 2 |
| x20 ph3 MSB | 191 | 183 | 171 | 163 | 151 | 147 | 135 | 131 | 119 | 111 | 9 | 91 | 79 | 71 | 59 | 51 | 39 | 31 | 19 | 11 |
| x20 ph3 LSB | 184 | 172 | 164 | 152 | 148 | 136 | 132 | 120 | 112 | 100 | 92 | 80 | 72 | 60 | 48 | 40 | 32 | 20 | 12 | 0 |
|  | 2 | 3 | 2 | 3 | 1 | 3 | 2 | 3 | 2 | 3 | 2 | 3 | 2 | 3 | 2 | 3 | 2 | 3 | 2 | 3 |
| x20 ph4 MSB | 191 | 183 | 175 | 167 | 159 | 147 | 139 | 127 | 119 | 107 | 99 | 87 | 79 | 67 | 59 | 47 | 39 | 27 | 19 | 7 |
| x20 ph4 LSB | 184 | 176 | 168 | 160 | 148 | 140 | 128 | 120 | 108 | 100 | 88 | 80 | 68 | 60 | 48 | 40 | 28 | 20 | 8 | 0 |
|  | 2 | 2 | 2 | 2 | 3 | 2 | 3 | 2 | 3 | 2 | 3 | 2 | 3 | 2 | 3 | 2 | 3 | 2 | 3 | 2 |
| x8 clm100 MSB | 191 | 167 | 143 | 119 | 95 | 71 | 47 | 23 |  |  |  |  |  |  |  |  |  |  |  |  |
| x8 clm100 LSB | 168 | 144 | 120 | 96 | 72 | 48 | 24 | 1 |  |  |  |  |  |  |  |  |  |  |  |  |
|  | 6 | 6 | 6 | 6 | 6 | 6 | 6 | 6 |  |  |  |  |  |  |  |  |  |  |  |  |
| x8 clm001/L0p MSB |  |  |  |  |  |  |  |  |  |  |  |  | 191 | 167 | 143 | 119 | 95 | 71 | 47 | 23 |
| x8 clm001/L0p LSB |  |  |  |  |  |  |  |  |  |  |  |  | 168 | 144 | 120 | 96 | 72 | 48 | 24 | 0 |
|  |  |  |  |  |  |  |  |  |  |  |  |  | 6 | 6 | 6 | 6 | 6 | 6 | 6 | 6 |

| Mapping | |
|---|---|
| Syndrome | Bit No. |
| 0x1 | 0 |
| 0x2 | 1 |
| 0x4 | 2 |
| 0x8 | 3 |
| 0x10 | 4 |
| 0x20 | 5 |
| 0x40 | 6 |
| 0x80 | 7 |
| 0x100 | 8 |
| 0x200 | 9 |
| 0x231 | 133 |
| 0x400 | 10 |
| 0x462 | 134 |
| 0x57b | 183 |
| 0x6f5 | 84 |
| 0x701 | 18 |
| 0x800 | 11 |
| 0x875 | 71 |
| 0x8c4 | 135 |
| 0xa9b | 90 |
| 0xaf6 | 184 |
| 0xc53 | 60 |
| 0xd95 | 178 |
| 0xdea | 85 |
| 0xe02 | 19 |
| 0xe2b | 44 |
| 0x1000 | 12 |
| 0x10ea | 72 |
| 0x1107 | 28 |
| 0x1188 | 136 |
| 0x1385 | 166 |
| 0x1439 | 103 |

| Mapping | |
|---|---|
| Syndrome | Bit No. |
| 0x1536 | 91 |
| 0x15ec | 185 |
| 0x18a6 | 61 |
| 0x1b2a | 179 |
| 0x1b9f | 40 |
| 0x1bd4 | 86 |
| 0x1c04 | 20 |
| 0x1c56 | 45 |
| 0x2000 | 13 |
| 0x21d4 | 73 |
| 0x2205 | 111 |
| 0x220e | 29 |
| 0x2310 | 137 |
| 0x23df | 144 |
| 0x270a | 167 |
| 0x2811 | 159 |
| 0x2872 | 104 |
| 0x2a6c | 92 |
| 0x2bd8 | 186 |
| 0x314c | 62 |
| 0x3654 | 180 |
| 0x373e | 41 |
| 0x3771 | 57 |
| 0x37a8 | 87 |
| 0x3808 | 21 |
| 0x38ac | 46 |
| 0x3d81 | 78 |
| 0x3dbb | 65 |
| 0x3ef1 | 126 |
| 0x4000 | 14 |
| 0x4053 | 129 |
| 0x42f1 | 155 |

| Mapping | |
|---|---|
| Syndrome | Bit No. |
| 0x4307 | 53 |
| 0x439f | 122 |
| 0x43a8 | 74 |
| 0x440a | 112 |
| 0x441c | 30 |
| 0x445f | 151 |
| 0x4620 | 138 |
| 0x46c1 | 34 |
| 0x47a1 | 116 |
| 0x47be | 145 |
| 0x4d6f | 98 |
| 0x4e14 | 168 |
| 0x5022 | 160 |
| 0x50e4 | 105 |
| 0x54d8 | 93 |
| 0x57b0 | 187 |
| 0x597d | 163 |
| 0x5a03 | 68 |
| 0x5abf | 175 |
| 0x5bd3 | 81 |
| 0x5f4d | 108 |
| 0x6298 | 63 |
| 0x6501 | 142 |
| 0x65ed | 190 |
| 0x69b7 | 26 |
| 0x6b11 | 38 |
| 0x6ca8 | 181 |
| 0x6e7c | 42 |
| 0x6ee2 | 58 |
| 0x6f50 | 88 |
| 0x7010 | 22 |
| 0x7158 | 47 |

| Mapping | |
|---|---|
| Syndrome | Bit No. |
| 0x72bb | 49 |
| 0x779b | 24 |
| 0x7b02 | 79 |
| 0x7b59 | 173 |
| 0x7b76 | 66 |
| 0x7ce1 | 149 |
| 0x7d11 | 120 |
| 0x7d37 | 51 |
| 0x7de2 | 127 |
| 0x7ead | 96 |
| 0x8000 | 15 |
| 0x80a6 | 130 |
| 0x8267 | 100 |
| 0x85e2 | 156 |
| 0x860e | 54 |
| 0x873e | 123 |
| 0x8750 | 75 |
| 0x8814 | 113 |
| 0x8838 | 31 |
| 0x88be | 152 |
| 0x8c40 | 139 |
| 0x8d82 | 35 |
| 0x8f42 | 117 |
| 0x8f7c | 146 |
| 0x8f8b | 170 |
| 0x9ade | 99 |
| 0x9c28 | 169 |
| 0xa044 | 161 |
| 0xa1c8 | 106 |
| 0xa6a7 | 153 |
| 0xa7ab | 32 |
| 0xa7f3 | 114 |

| Mapping | |
|---|---|
| Syndrome | Bit No. |
| 0xa8cd | 171 |
| 0xa923 | 147 |
| 0xa95f | 118 |
| 0xa9b0 | 94 |
| 0xacdf | 36 |
| 0xaf5b | 140 |
| 0xaf60 | 188 |
| 0xb2fa | 164 |
| 0xb315 | 101 |
| 0xb406 | 69 |
| 0xb57e | 176 |
| 0xb697 | 131 |
| 0xb7a6 | 82 |
| 0xb7db | 16 |
| 0xb97b | 76 |
| 0xb9a7 | 124 |
| 0xbbc7 | 55 |
| 0xbc1f | 157 |
| 0xbe9a | 109 |
| 0xc055 | 56 |
| 0xc495 | 125 |
| 0xc52d | 77 |
| 0xc530 | 64 |
| 0xca02 | 143 |
| 0xcaef | 110 |
| 0xcbda | 191 |
| 0xcfe5 | 158 |
| 0xd1f1 | 102 |
| 0xd22f | 165 |
| 0xd36e | 27 |
| 0xd622 | 39 |
| 0xd86d | 17 |

| Mapping | |
|---|---|
| Syndrome | Bit No. |
| 0xd897 | 83 |
| 0xd950 | 182 |
| 0xdaf5 | 132 |
| 0xdcf8 | 43 |
| 0xdd27 | 177 |
| 0xddc4 | 59 |
| 0xdea0 | 89 |
| 0xdfd7 | 70 |
| 0xe020 | 23 |
| 0xe2b0 | 48 |
| 0xe4bb | 95 |
| 0xe565 | 119 |
| 0xe576 | 50 |
| 0xe59d | 148 |
| 0xe641 | 172 |
| 0xe91b | 189 |
| 0xe96d | 141 |
| 0xee65 | 37 |
| 0xef36 | 25 |
| 0xf44b | 107 |
| 0xf604 | 80 |
| 0xf6b2 | 174 |
| 0xf6ec | 67 |
| 0xf753 | 162 |
| 0xf83d | 115 |
| 0xf88d | 33 |
| 0xf9c2 | 150 |
| 0xfa22 | 121 |
| 0xfa6e | 52 |
| 0xfa95 | 154 |
| 0xfbc4 | 128 |
| 0xfd5a | 97 |

| Mapping | |
|---|---|
| Syndrome | Bit No. |
| 0x3 | 0-1 |
| 0x6 | 1-2 |
| 0xc | 2-3 |
| 0x18 | 3-4 |
| 0x30 | 4-5 |
| 0x60 | 5-6 |
| 0xc0 | 6-7 |
| 0x180 | 7-8 |
| 0x300 | 8-9 |
| 0x600 | 9-10 |
| 0x653 | 133-134 |
| 0x903 | 18-19 |
| 0xb1f | 84-85 |
| 0xc00 | 10-11 |
| 0xca6 | 134-135 |
| 0xf8d | 183-184 |
| 0x1206 | 19-20 |
| 0x127d | 44-45 |
| 0x13a3 | 169-170 |
| 0x14f5 | 60-61 |
| 0x163e | 85-86 |
| 0x16bf | 178-179 |
| 0x1800 | 11-12 |
| 0x189f | 71-72 |
| 0x18b9 | 99-100 |
| 0x194c | 135-136 |
| 0x1f1a | 184-185 |
| 0x1fad | 90-91 |
| 0x215d | 35-36 |
| 0x231b | 139-140 |
| 0x240c | 20-21 |
| 0x24fa | 45-46 |

| Mapping | |
|---|---|
| Syndrome | Bit No. |
| 0x261d | 117-118 |
| 0x265f | 146-147 |
| 0x2746 | 170-171 |
| 0x29ea | 61-62 |
| 0x2c7c | 86-87 |
| 0x2ca1 | 40-41 |
| 0x2d7e | 179-180 |
| 0x2e19 | 152-153 |
| 0x2f93 | 31-32 |
| 0x2fe7 | 113-114 |
| 0x3000 | 12-13 |
| 0x313e | 72-73 |
| 0x3172 | 100-101 |
| 0x3298 | 136-137 |
| 0x3309 | 28-29 |
| 0x348f | 166-167 |
| 0x3631 | 130-131 |
| 0x37db | 15-16 |
| 0x39fd | 156-157 |
| 0x3c4b | 103-104 |
| 0x3dc9 | 54-55 |
| 0x3e2b | 75-76 |
| 0x3e34 | 185-186 |
| 0x3e99 | 123-124 |
| 0x3f5a | 91-92 |
| 0x42ba | 36-37 |
| 0x4313 | 126-127 |
| 0x4636 | 140-141 |
| 0x467b | 188-189 |
| 0x1683 | 78-79 |
| 0x46cd | 65-66 |
| 0x4818 | 21-22 |

| Mapping | |
|---|---|
| Syndrome | Bit No. |
| 0x49f4 | 46-47 |
| 0x4c3a | 118-119 |
| 0x4cbe | 147-148 |
| 0x4d0b | 94-95 |
| 0x4e8c | 171-172 |
| 0x53d4 | 62-63 |
| 0x5583 | 106-107 |
| 0x5717 | 161-162 |
| 0x58f8 | 87-88 |
| 0x5942 | 41-42 |
| 0x5993 | 57-58 |
| 0x5afc | 180-181 |
| 0x5c32 | 153-154 |
| 0x5f26 | 32-33 |
| 0x5fce | 114-115 |
| 0x6000 | 13-14 |
| 0x60d5 | 164-165 |
| 0x627c | 73-74 |
| 0x62e4 | 101-102 |
| 0x6461 | 144-145 |
| 0x6530 | 137-138 |
| 0x660f | 111-112 |
| 0x6612 | 29-30 |
| 0x6859 | 176-177 |
| 0x691e | 167-168 |
| 0x6bd1 | 69-70 |
| 0x6c62 | 131-132 |
| 0x6f31 | 82-83 |
| 0x6fb6 | 16-17 |
| 0x73fa | 157-158 |
| 0x7475 | 109-110 |
| 0x7833 | 159-160 |

FIG. 13-1
1300

| Mapping | |
|---|---|
| Syndrome | Bit No. |
| 0x7896 | 104-105 |
| 0x7b92 | 55-56 |
| 0x7c56 | 76-77 |
| 0x7c68 | 186-187 |
| 0x7d32 | 124-125 |
| 0x7eb4 | 92-93 |
| 0x83f7 | 96-97 |
| 0x8523 | 149-150 |
| 0x8574 | 37-38 |
| 0x8626 | 127-128 |
| 0x8681 | 25-26 |
| 0x8733 | 120-121 |
| 0x8759 | 51-52 |
| 0x8c6c | 141-142 |
| 0x8cf6 | 189-190 |
| 0x8d06 | 79-80 |
| 0x8d9a | 66-67 |
| 0x8deb | 173-174 |
| 0x900b | 48-49 |
| 0x9030 | 22-23 |
| 0x93e8 | 47-48 |
| 0x97bb | 23-24 |
| 0x97cd | 49-50 |
| 0x9841 | 50-51 |
| 0x9874 | 119-120 |
| 0x98ad | 24-25 |
| 0x997c | 148-149 |
| 0x9a16 | 95-96 |
| 0x9d18 | 172-173 |
| 0xa7a8 | 63-64 |
| 0xab06 | 107-108 |
| 0xac0d | 174-175 |

| Mapping | |
|---|---|
| Syndrome | Bit No. |
| 0xacef | 67-68 |
| 0xadd7 | 80-81 |
| 0xae2e | 162-163 |
| 0xae37 | 190-191 |
| 0xaf03 | 142-143 |
| 0xb035 | 97-98 |
| 0xb1f0 | 88-89 |
| 0xb284 | 42-43 |
| 0xb326 | 58-59 |
| 0xb5f8 | 181-182 |
| 0xb864 | 154-155 |
| 0xb969 | 52-53 |
| 0xb9bd | 121-122 |
| 0xbad9 | 26-27 |
| 0xbb97 | 128-129 |
| 0xbd33 | 38-39 |
| 0xbd9d | 150-151 |
| 0xbe4c | 33-34 |
| 0xbf9c | 115-116 |
| 0xc000 | 14-15 |
| 0xc0f5 | 129-130 |
| 0xc1aa | 165-166 |
| 0xc269 | 27-28 |
| 0xc4a1 | 122-123 |
| 0xc4f8 | 74-75 |
| 0xc509 | 53-54 |
| 0xc5c8 | 102-103 |
| 0xc713 | 155-156 |
| 0xc8c2 | 145-146 |
| 0xc8e3 | 116-117 |
| 0xca60 | 138-139 |
| 0xcb43 | 34-35 |

| Mapping | |
|---|---|
| Syndrome | Bit No. |
| 0xcc1e | 112-113 |
| 0xcc24 | 30-31 |
| 0xcce1 | 151-152 |
| 0xcdbd | 39-40 |
| 0xd0b2 | 177-178 |
| 0xd197 | 59-60 |
| 0xd23c | 168-169 |
| 0xd2d3 | 43-44 |
| 0xd43b | 89-90 |
| 0xd7a2 | 70-71 |
| 0xd7b1 | 98-99 |
| 0xd8c4 | 132-133 |
| 0xdc2b | 182-183 |
| 0xde62 | 83-84 |
| 0xdf6c | 17-18 |
| 0xe1d7 | 108-109 |
| 0xe7f4 | 158-159 |
| 0xe8ea | 110-111 |
| 0xe9dd | 143-144 |
| 0xeb87 | 163-164 |
| 0xec75 | 81-82 |
| 0xee05 | 68-69 |
| 0xefc1 | 175-176 |
| 0xf066 | 160-161 |
| 0xf12c | 105-106 |
| 0xf724 | 56-57 |
| 0xf88b | 64-65 |
| 0xf8ac | 77-78 |
| 0xf8d0 | 187-188 |
| 0xfa64 | 125-126 |
| 0xfd68 | 93-94 |

*FIG. 13-2*

PROBABILISTIC FLIT ERROR CHECKING

FIELD

The present disclosure relates in general to the field of computer development, and more specifically, to bit error detection on computing links.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures. Further, higher-rates can additionally complicate the detection and handling of errors on links of the interconnect, among other issues.

BRIEF DESCRIPTION OF THE DRAWINGS

FIG. 8 illustrates a representation of an example flit, including CRC bits, sent over an example eight-lane data link.

FIG. 9 illustrates a representation of an example flit sent over an example eight-lane data link.

FIG. 10 illustrates a representation of an example flit sent over an example twenty-lane data link.

FIG. 11 illustrates a table indicating swizzling formats utilized in some implementations.

FIGS. 12-1 and 12-2 illustrate an example syndrome decoder table.

FIGS. 13-1 and 13-2 illustrate another example of a syndrome decoder table.

Like reference numbers and designations in the various drawings indicate like elements.

DETAILED DESCRIPTION

Figure 1:
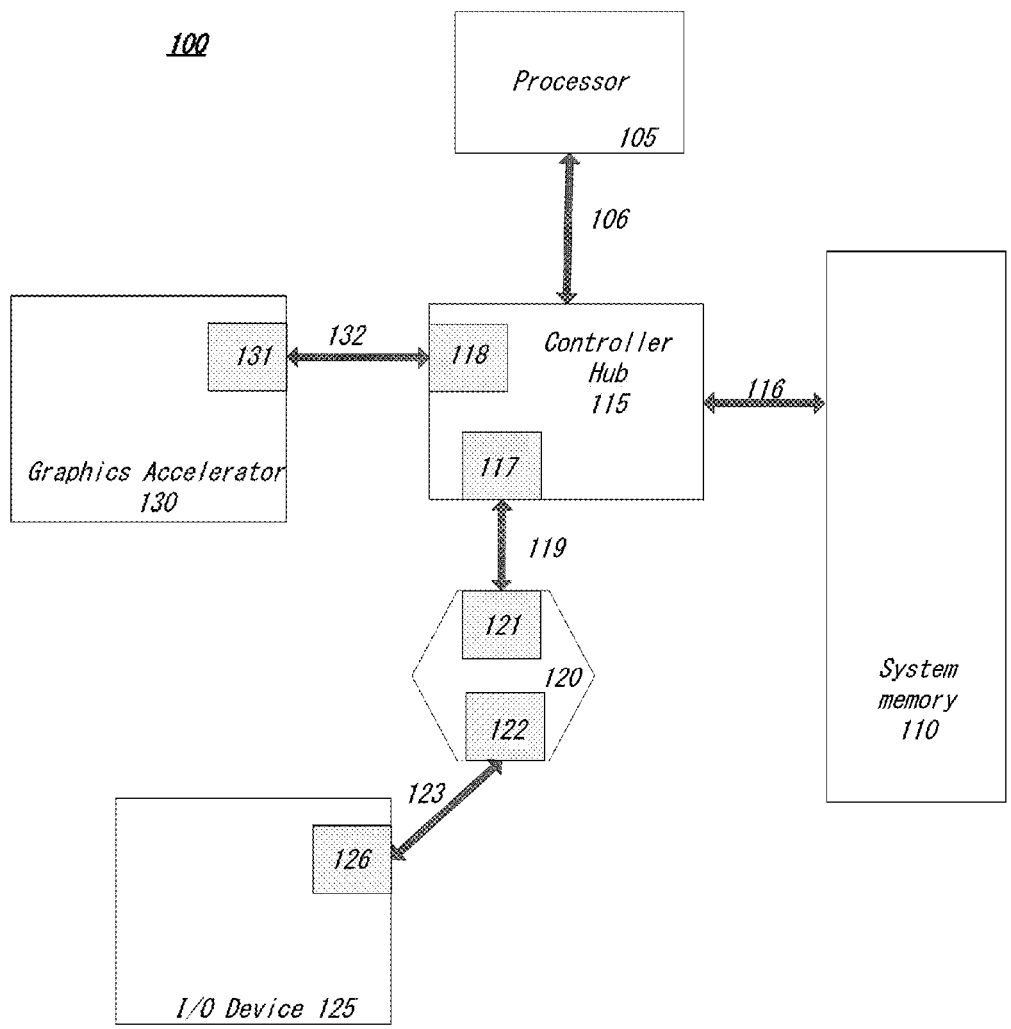
FIG. 1 illustrates a simplified block diagram of a system including a serial point-to-point interconnect to connect I/O devices in a computer system in accordance with one embodiment.

In the following description, numerous specific details are set forth, such as examples of specific types of processors and system configurations, specific hardware structures, specific architectural and micro architectural details, specific register configurations, specific instruction types, specific system components, specific processor pipeline stages, specific interconnect layers, specific packet/transaction configurations, specific transaction names, specific protocol exchanges, specific link widths, specific implementations, and operation etc. in order to provide a thorough understanding of the present invention. It may be apparent, however, to one skilled in the art that these specific details need not necessarily be employed to practice the subject matter of the present disclosure. In other instances, well detailed description of known components or methods has been avoided, such as specific and alternative processor architectures, specific logic circuits/code for described algorithms, specific firmware code, low-level interconnect operation, specific logic configurations, specific manufacturing techniques and materials, specific compiler implementations, specific expression of algorithms in code, specific power down and gating techniques/logic and other specific operational details of computer system in order to avoid unnecessarily obscuring the present disclosure.

Although the following embodiments may be described with reference to energy conservation, energy efficiency, processing efficiency, and so on in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from such features. For example, the disclosed embodiments are not limited to server computer system, desktop computer systems, laptops, Ultrabooks™, but may be also used in other devices, such as handheld devices, smartphones, tablets, other thin notebooks, systems on a chip (SOC) devices, and embedded applications. Some examples of handheld devices include cellular phones, Internet protocol devices, digital cameras, personal digital assistants (PDAs), and handheld PCs. Here, similar techniques for a high-performance interconnect may be applied to increase performance (or even save power) in a low power interconnect. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As may become readily apparent in the description below, the embodiments of methods, apparatus', and systems described herein (whether in reference to hardware, firmware, software, or a combination thereof) may be considered vital to a "green technology" future balanced with performance considerations.

As computing systems are advancing, the components therein are becoming more complex. The interconnect architecture to couple and communicate between the components has also increased in complexity to ensure bandwidth demand is met for optimal component operation. Furthermore, different market segments demand different aspects of interconnect architectures to suit the respective market. For example, servers require higher performance, while the mobile ecosystem is sometimes able to sacrifice overall performance for power savings. Yet, it is a singular purpose of most fabrics to provide highest possible performance with maximum power saving. Further, a variety of different interconnects can potentially benefit from subject matter described herein. For instance, the Peripheral Component Interconnect (PCI) Express (PCIe) interconnect fabric architecture and QuickPath Interconnect (QPI) fabric architecture, among other examples, can potentially be improved according to one or more principles described herein, among other examples.

FIG. 1 illustrates one embodiment of a fabric composed of point-to-point Links that interconnect a set of components is illustrated. System 100 includes processor 105 and system memory 110 coupled to controller hub 115. Processor 105 can include any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 can include a root hub, root complex, or root controller, such as in a PCIe interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, can include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a bridge (e.g., a PCIe to PCI/PCI-X bridge) to support legacy or other versions of devices or interconnect fabrics supported by such devices.

Graphics accelerator 130 can also be coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack and associated logic to communicate between graphics accelerator 130 and controller hub 115. Similar to the MCH discussion above, a graphics controller or the graphics accelerator 130 itself may be integrated in processor 105.

Figure 2:
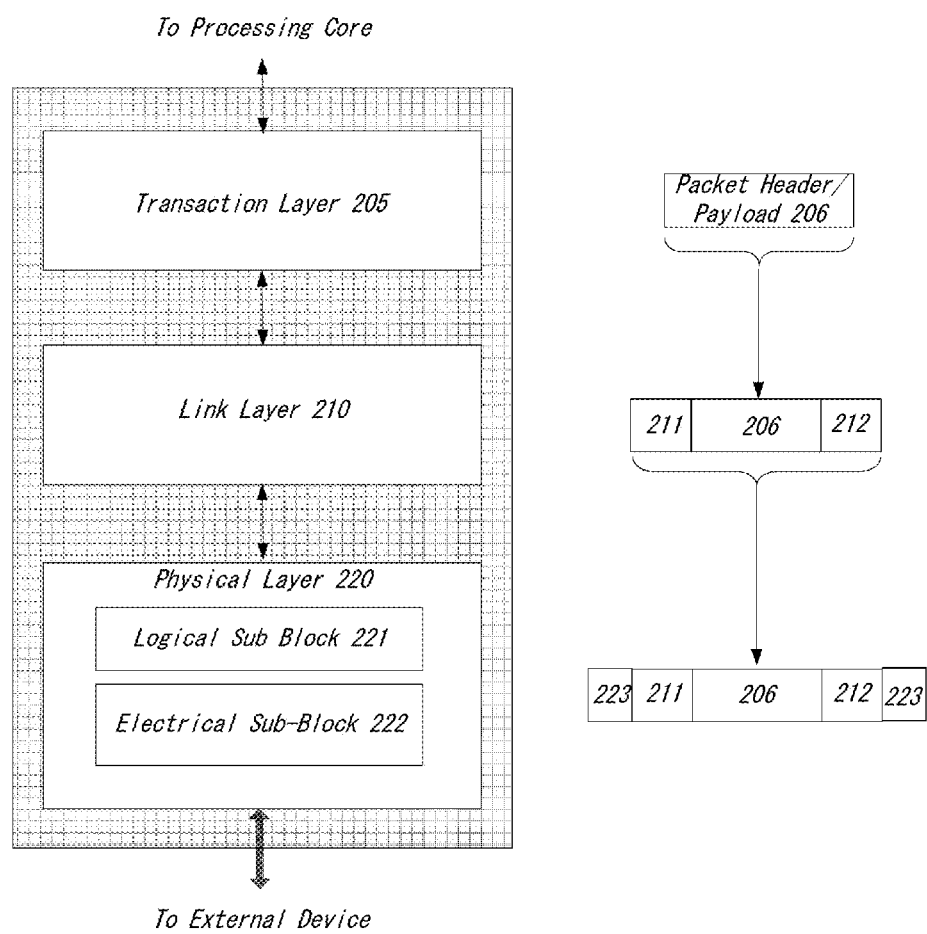
FIG. 2 illustrates a simplified block diagram of a layered protocol stack in accordance with one embodiment.

Turning to FIG. 2 an embodiment of a layered protocol stack is illustrated. Layered protocol stack 200 can includes any form of a layered communication stack, such as a QPI stack, a PCIe stack, a next generation high performance computing interconnect (HPI) stack, or other layered stack. In one embodiment, protocol stack 200 can include transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

Packets can be used to communicate information between components. Packets can be formed in the Transaction Layer 205 and Data Link Layer 210 to carry the information from the transmitting component to the receiving component. As the transmitted packets flow through the other layers, they are extended with additional information used to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

In one embodiment, transaction layer 205 can provide an interface between a device's processing core and the interconnect architecture, such as Data Link Layer 210 and Physical Layer 220. In this regard, a primary responsibility of the transaction layer 205 can include the assembly and disassembly of packets (i.e., transaction layer packets, or TLPs). The translation layer 205 can also manage credit-based flow control for TLPs. In some implementations, split transactions can be utilized, i.e., transactions with request and response separated by time, allowing a link to carry other traffic while the target device gathers data for the response, among other examples.

Credit-based flow control can be used to realize virtual channels and networks utilizing the interconnect fabric. In one example, a device can advertise an initial amount of credits for each of the receive buffers in Transaction Layer 205. An external device at the opposite end of the link, such as controller hub 115 in FIG. 1, can count the number of credits consumed by each TLP. A transaction may be transmitted if the transaction does not exceed a credit limit. Upon receiving a response an amount of credit is restored. One example of an advantage of such a credit scheme is that the latency of credit return does not affect performance, provided that the credit limit is not encountered, among other potential advantages.

In one embodiment, four transaction address spaces can include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions can be used to access configuration space of various devices connected to the interconnect. Transactions to the configuration space can include read requests and write requests. Message space transactions (or, simply messages) can also be defined to support in-band communication between interconnect agents. Therefore, in one example embodiment, transaction layer 205 can assemble packet header/payload 206.

A Link layer 210, also referred to as data link layer 210, can act as an intermediate stage between transaction layer 205 and the physical layer 220. In one embodiment, a responsibility of the data link layer 210 is providing a reliable mechanism for exchanging Transaction Layer Packets (TLPs) between two components on a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

In one example, physical layer 220 includes logical sub block 221 and electrical sub-block 222 to physically transmit a packet to an external device. Here, logical sub-block 221 is responsible for the "digital" functions of Physical Layer 221. In this regard, the logical sub-block can include a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one example embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a protocol stack (such as a PCIe protocol stack), a layered protocol stack is not so limited. In fact, any layered protocol may be included/implemented and adopt features discussed herein. As an example, a port/interface that is represented as a layered protocol can include: (1) a first layer to assemble packets, i.e. a transaction layer; a second layer to sequence packets, i.e. a link layer; and a third layer to transmit the packets, i.e. a physical layer. As a specific example, a high performance interconnect layered protocol, as described herein, is utilized.

Figure 3:
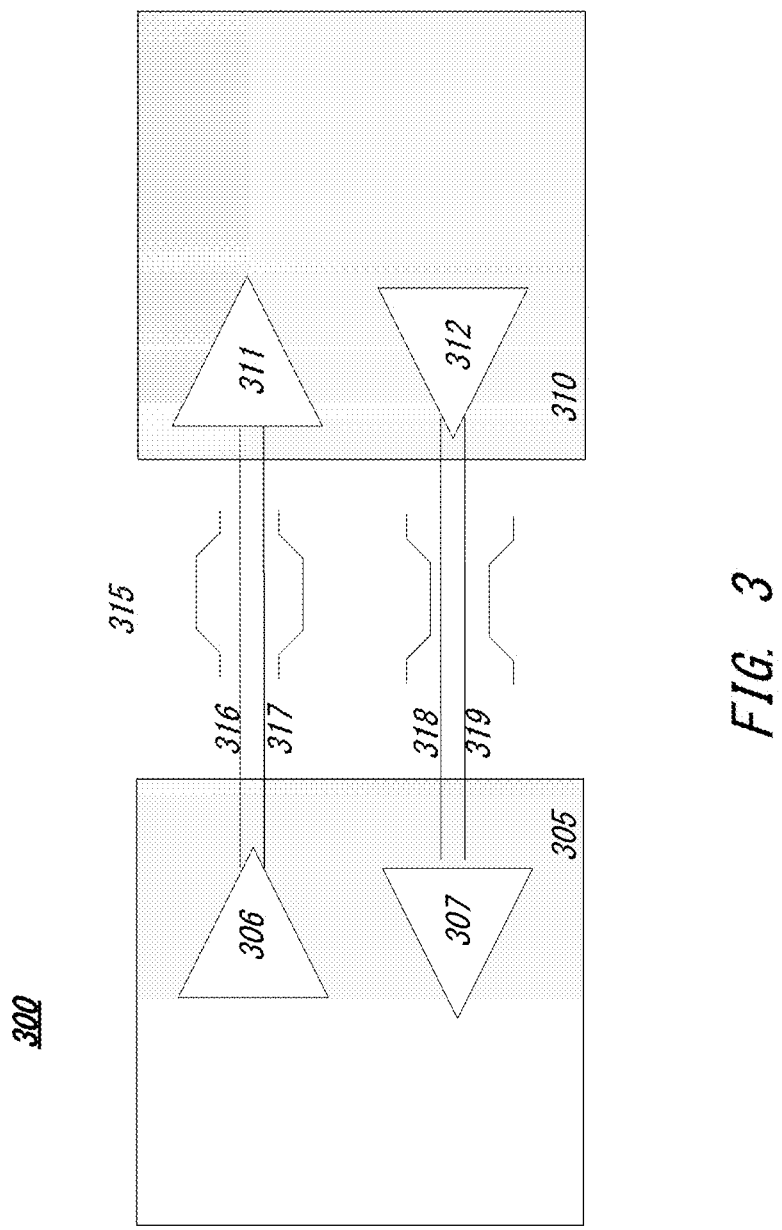
FIG. 3 illustrates an embodiment of a serial point-to-point link.

Referring next to FIG. 3, an example embodiment of a serial point to point fabric is illustrated. A serial point-to-point link can include any transmission path for transmitting serial data. In the embodiment shown, a link can include two, low-voltage, differentially driven signal pairs: a transmit pair 306/311 and a receive pair 312/307. Accordingly, device 305 includes transmission logic 306 to transmit data to device 310 and receiving logic 307 to receive data from device 310. In other words, two transmitting paths, i.e. paths 316 and 317, and two receiving paths, i.e. paths 318 and 319, are included in some implementations of a link.

A transmission path refers to any path for transmitting data, such as a transmission line, a copper line, an optical line, a wireless communication channel, an infrared communication link, or other communication path. A connection between two devices, such as device 305 and device 310, is referred to as a link, such as link 315. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair can refer to two transmission paths, such as lines 316 and 317, to transmit differential signals. As an example, when line 316 toggles from a low voltage level to a high voltage level, i.e. a rising edge, line 317 drives from a high logic level to a low logic level, i.e. a falling edge. Differential signals potentially demonstrate better electrical characteristics, such as better signal integrity, i.e. cross-coupling, voltage overshoot/undershoot, ringing, among other example advantages. This allows for a better timing window, which enables faster transmission frequencies.

In one embodiment, a new High Performance Interconnect (HPI) is provided. HPI can include a next-generation cache-coherent, link-based interconnect. As one example, HPI may be utilized in high performance computing platforms, such as workstations or servers, including in systems where PCIe or another interconnect protocol is typically used to connect processors, accelerators, I/O devices, and the like. However, HPI is not so limited. Instead, HPI may be utilized in any of the systems or platforms described herein. Furthermore, the individual ideas developed may be applied to other interconnects and platforms, such as PCIe, MIPI, QPI, etc.

Figure 4:
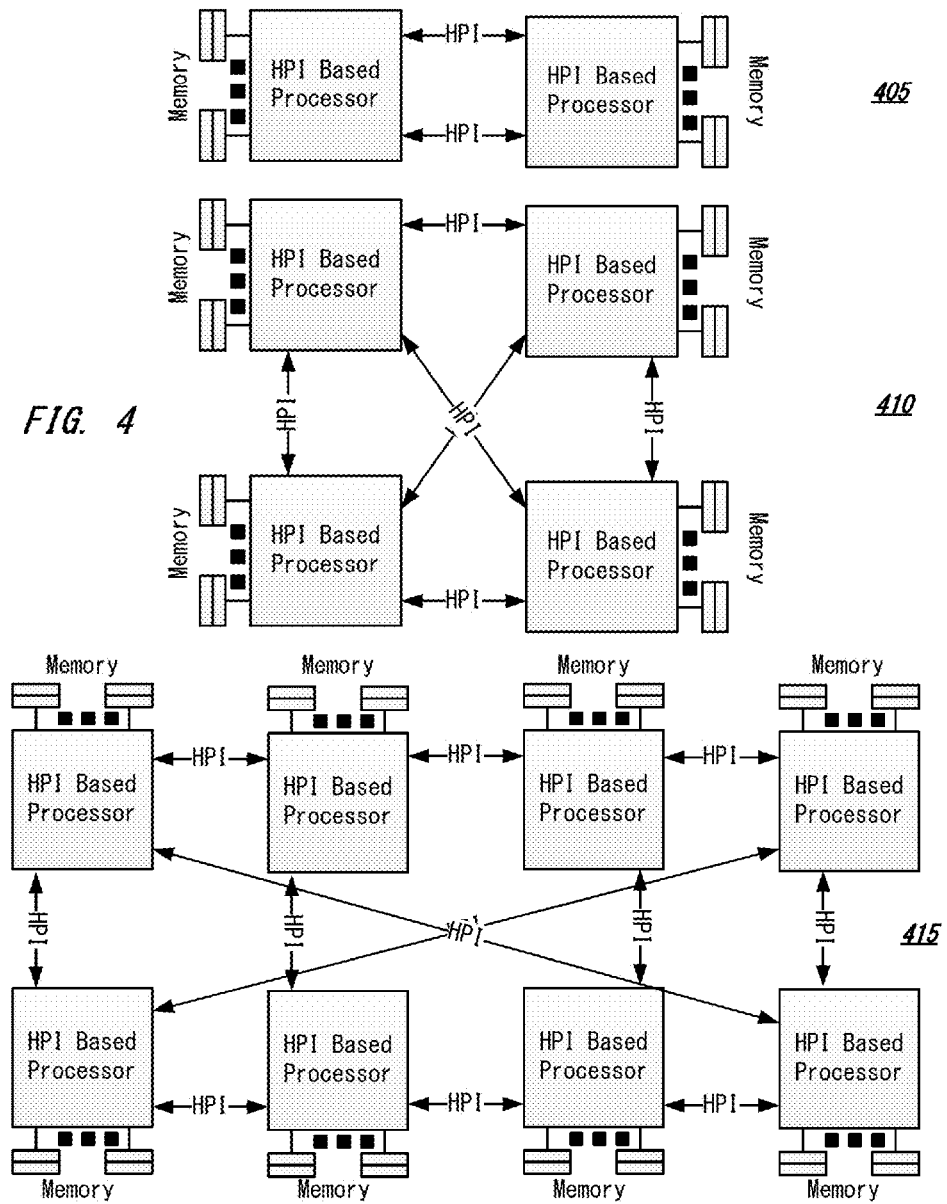
FIG. 4 illustrates embodiments of potential High Performance Interconnect (HPI) system configurations.

To support multiple devices, in one example implementation, HPI can include an Instruction Set Architecture (ISA) agnostic (i.e. HPI is able to be implemented in multiple different devices). In another scenario, HPI may also be utilized to connect high performance I/O devices, not just processors or accelerators. For example, a high performance PCIe device may be coupled to HPI through an appropriate translation bridge (i.e. HPI to PCIe). Moreover, the HPI links may be utilized by many HPI based devices, such as processors, in various ways (e.g. stars, rings, meshes, etc.). FIG. 4 illustrates example implementations of multiple potential multi-socket configurations. A two-socket configuration 405, as depicted, can include two HPI links; however, in other implementations, one HPI link may be utilized. For larger topologies, any configuration may be utilized as long as an identifier (ID) is assignable and there is some form of virtual path, among other additional or substitute features. As shown, in one example, a four socket configuration 410 has an HPI link from each processor to another. But in the eight socket implementation shown in configuration 415, not every socket is directly connected to each other through an HPI link. However, if a virtual path or channel exists between the processors, the configuration is supported. A range of supported processors includes 2-32 in a native domain. Higher numbers of processors may be reached through use of multiple domains or other interconnects between node controllers, among other examples.

Figure 5:
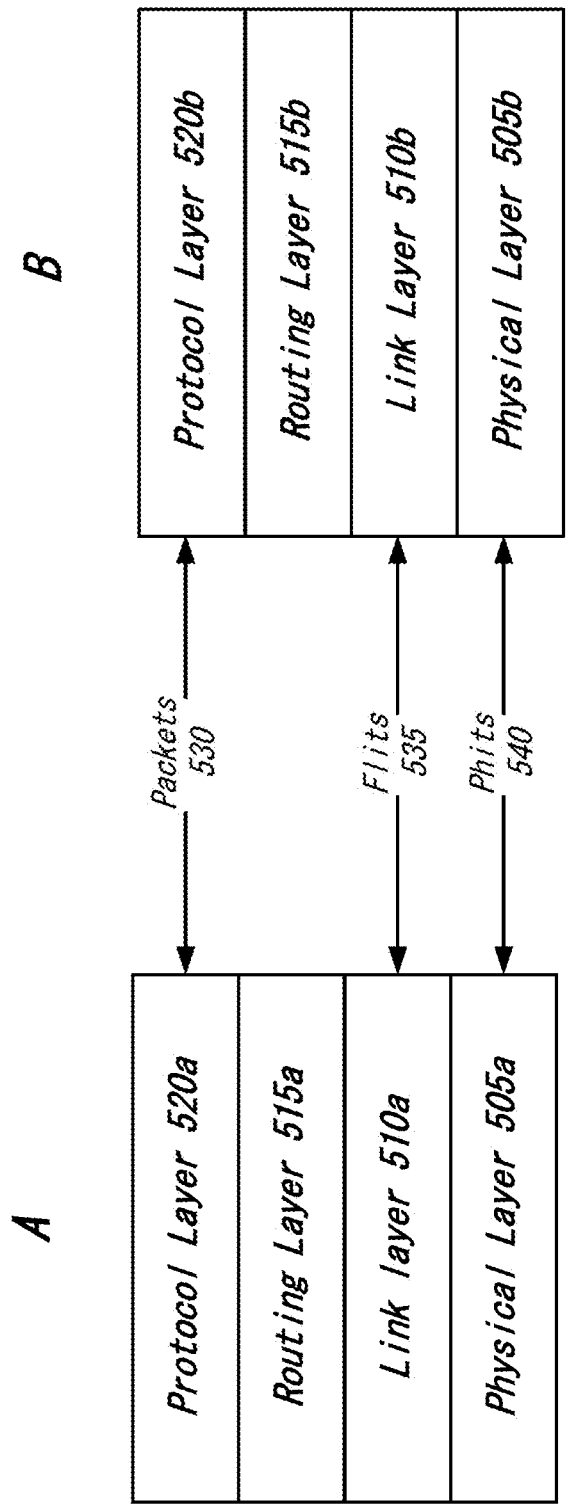
FIG. 5 illustrates an embodiment of a layered protocol stack associated with HPI.

The HPI architecture includes a definition of a layered protocol architecture, including in some examples, protocol layers (coherent, non-coherent, and, optionally, other memory based protocols), a routing layer, a link layer, and a physical layer including associated I/O logic. Furthermore, HPI can further include enhancements related to power managers (such as power control units (PCUs)), design for test and debug (DFT), fault handling, registers, security, among other examples. FIG. 5 illustrates an embodiment of an example HPI layered protocol stack. In some implementations, at least some of the layers illustrated in FIG. 5 may be optional. Each layer deals with its own level of granularity or quantum of information (the protocol layer 505a,b with packets 530, link layer 510a,b with flits 535, and physical layer 505a,b with phits 540). Note that a packet, in some embodiments, may include partial flits, a single flit, or multiple flits based on the implementation.

As a first example, a width of a phit 540 includes a 1 to 1 mapping of link width to bits (e.g. 20 bit link width includes a phit of 20 bits, etc.). Flits may have a greater size, such as 184, 192, or 200 bits. Note that if phit 540 is 20 bits wide and the size of flit 535 is 184 bits then it takes a fractional number of phits 540 to transmit one flit 535 (e.g. 9.2 phits at 20 bits to transmit an 184 bit flit 535 or 9.6 at 20 bits to transmit a 192 bit flit, among other examples). Note that widths of the fundamental link at the physical layer may vary. For example, the number of lanes per direction may include 2, 4, 6, 8, 10, 12, 14, 16, 18, 20, 22, 24, etc. In one embodiment, link layer 510a,b is capable of embedding multiple pieces of different transactions in a single flit, and one or multiple headers (e.g. 1, 2, 3, 4) may be embedded within the flit. In one example, HPI splits the headers into corresponding slots to enable multiple messages in the flit destined for different nodes.

Physical layer 505a,b, in one embodiment, can be responsible for the fast transfer of information on the physical medium (electrical or optical etc.). The physical link can be point-to-point between two Link layer entities, such as layer 505a and 505b. The Link layer 510a,b can abstract the Physical layer 505a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 520a,b relies on the Link layer 510a,b to map protocol messages into the appropriate message classes and virtual channels before handing them to the Physical layer 505a,b for transfer across the physical links. Link layer 510a,b may support multiple messages, such as a request, snoop, response, writeback, non-coherent data, among other examples.

The Physical layer 505a,b (or PHY) of HPI can be implemented above the electrical layer (i.e. electrical conductors connecting two components) and below the link layer 510a,b, as illustrated in FIG. 5. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer 505a,b, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 510a,b can be implemented so as to provide reliable data transfer between two protocol or routing entities. The Link layer can abstract Physical layer 505a,b from the Protocol layer 520a,b, and can be responsible for the flow control between two protocol agents (A, B), and provide virtual channel services to the Protocol layer (Message Classes) and Routing layer (Virtual Networks). The interface between the Protocol layer 520a,b and the Link Layer 510a,b can typically be at the packet level. In one embodiment, the smallest transfer unit at the Link Layer is referred to as a flit which a specified number of bits, such as 192 bits or some other denomination. The Link Layer 510a,b relies on the Physical layer 505a,b to frame the Physical layer's 505a,b unit of transfer (phit) into the Link Layer's 510a,b unit of transfer (flit). In addition, the Link Layer 510a,b may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 515a,b can provide a flexible and distributed method to route HPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a HPI packet into the HPI fabric. The lookup at an intermediate router may be used to route an HPI packet from an input port to an output port. The lookup at a destination port may be used to target the destination HPI protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 515a,b relies on the Link layer 510a,b for providing the use of up to three (or more) virtual networks (VNs)—in one example, two deadlock-free VNs, VN0 and VN1 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In one embodiment, HPI can include a Coherence Protocol layer 520a,b is support agents caching lines of data from memory. An agent wishing to cache memory data may use the coherence protocol to read the line of data to load into its cache. An agent wishing to modify a line of data in its cache may use the coherence protocol to acquire ownership of the line before modifying the data. After modifying a line, an agent may follow protocol requirements of keeping it in its cache until it either writes the line back to memory or includes the line in a response to an external request. Lastly, an agent may fulfill external requests to invalidate a line in its cache. The protocol ensures coherency of the data by dictating the rules all caching agents may follow. It also provides the means for agents without caches to coherently read and write memory data.

Two conditions may be enforced to support transactions utilizing the HPI Coherence Protocol. First, the protocol can maintain data consistency, as an example, on a per-address basis, among data in agents' caches and between those data and the data in memory. Informally, data consistency may refer to each valid line of data in an agent's cache representing a most up-to-date value of the data and data transmitted in a coherence protocol packet can represent the most up-to-date value of the data at the time it was sent. When no valid copy of the data exists in caches or in transmission, the protocol may ensure the most up-to-date value of the data resides in memory. Second, the protocol can provide well-defined commitment points for requests. Commitment points for reads may indicate when the data is usable; and for writes they may indicate when the written data is globally observable and will be loaded by subsequent reads. The protocol may support these commitment points for both cacheable and uncacheable (UC) requests in the coherent memory space.

The HPI Coherence Protocol also may ensure the forward progress of coherence requests made by an agent to an address in the coherent memory space. Certainly, transactions may eventually be satisfied and retired for proper system operation. The HPI Coherence Protocol, in some embodiments, may have no notion of retry for resolving resource allocation conflicts. Thus, the protocol itself may be defined to contain no circular resource dependencies, and implementations may take care in their designs not to introduce dependencies that can result in deadlocks. Additionally, the protocol may indicate where designs are able to provide fair access to protocol resources.

Logically, the HPI Coherence Protocol, in one embodiment, can include three items: coherence (or caching) agents, home agents, and the HPI interconnect fabric connecting the agents. Coherence agents and home agents can work together to achieve data consistency by exchanging messages over the interconnect. The link layer 510a,b and its related description can provide the details of the interconnect fabric including how it adheres to the coherence protocol's requirements, discussed herein. (It may be noted that the division into coherence agents and home agents is for clarity. A design may contain multiple agents of both types within a socket or even combine agents behaviors into a single design unit, among other examples.)

In some implementations, HPI can utilize an embedded clock. A clock signal can be embedded in data transmitted using the interconnect. With the clock signal embedded in the data, distinct and dedicated clock lanes can be omitted. This can be useful, for instance, as it can allow more pins of a device to be dedicated to data transfer, particularly in systems where space for pins is at a premium.

The Link layer can guarantee reliable data transfer between two protocol or routing entities. The Link layer can abstract the Physical layer from the Protocol layer, handle flow control between two protocol agents, and provide virtual channel services to the Protocol layer (Message Classes) and Routing layer (Virtual Networks).

In some implementations, the Link layer can deal with a fixed quantum of information, termed a flit. In one example, the flit can be defined to be 192 bits in length. However, any range of bits, such as 81-256 (or more) may be utilized in different variations. A large flit size, such as 192 bits, may include format, cyclic redundancy check (CRC), and other changes. For instance, a larger flit length can also permit the CRC field to be expanded (e.g., to 16 bits) to handle the larger flit payload. The number of phits or unit intervals (UI) (e.g., the time used to transfer a single bit or phit, etc.) to transfer a single flit can vary with link width. For instance, a 20 lane or bit link width can transfer a single 192 bit flit in 9.6 UI, while an 8 lane link width transfers the same flit in 24 UI, among other potential examples. The link layer crediting and protocol packetizing can also be based on a flit.

Figure 6:
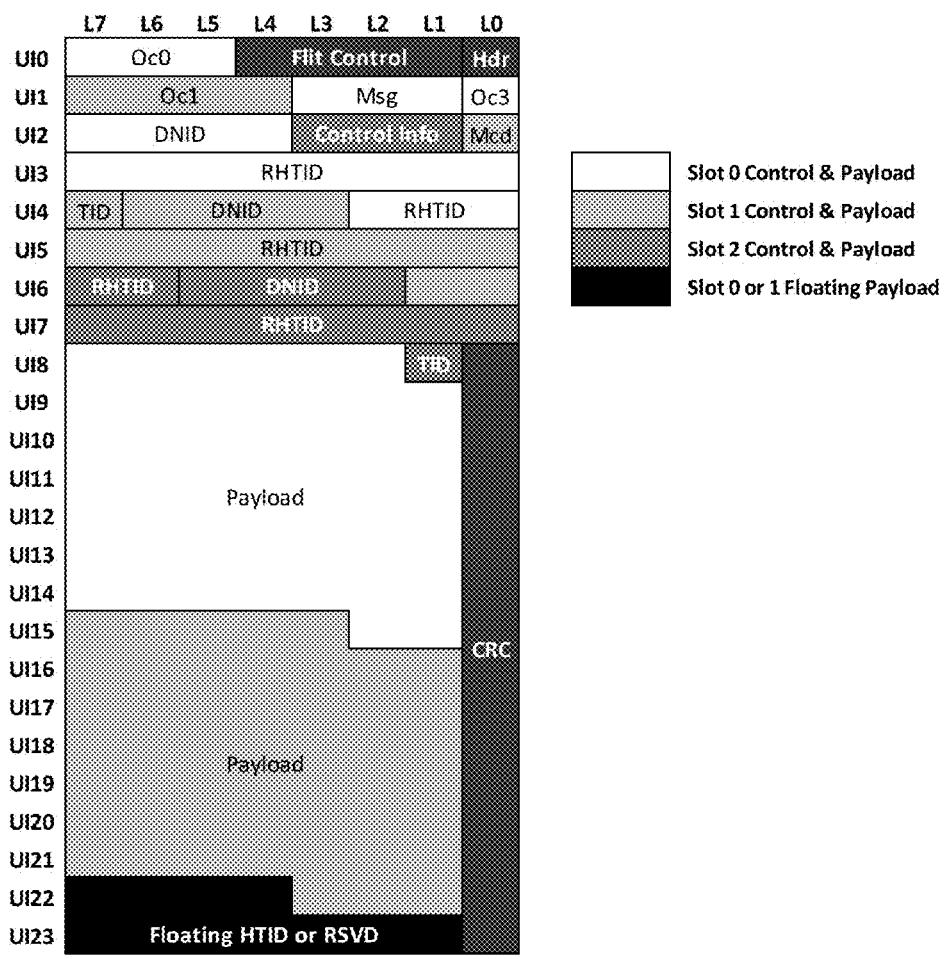
FIG. 6 illustrates a representation of an example multi-slot flit.

FIG. 6 illustrates a representation 600 of a generalized flit for an 8 lane link width. Each column of the representation 600 can symbolize a link lane and each row a respective UI. In some implementations, a single flit can be subdivided into two or more slots. Distinct messages or link layer headers can be included in each slot, allowing multiple distinct, and in some cases, independent messages corresponding to potentially different transactions to be sent in a single flit. Further, the multiple messages included in slots of a single flit may also be destined to different destination nodes, among other examples. For instance, the example of FIG. 6 illustrates a flit format with three slots. The shaded portions can represent the portion of the flit included in a respective slot.

In the example of FIG. 6, three slots, Slots 0, 1, and 2, are provided. Slot 0 can be provided 72 bits of flit space, of which 22 bits are dedicated to message header fields and 50 bits to message payload space. Slot 1 can be provided with 70 bits of flit space, of which 20 bits are dedicated to message header fields and 50 bits to message payload space. The difference in message header field space between can be optimized to provide that certain message types will be designated for inclusion in Slot 0 (e.g., where more message header encoding is utilized). A third slot, Slot 2, can be provided that occupies substantially less space than Slots 0 and 1, in this case utilizing 18 bits of flit space. Slot 2 can be optimized to handle those messages, such as acknowledges, credit returns, and the like that do no utilize larger message payloads. Additionally, a floating payload field can be provided that allows an additional 11 bits to be alternatively applied to supplement the payload field of either Slot 0 or Slot 1.

Continuing with the specific example of FIG. 6, other fields can be global to a flit (i.e., apply across the flit and not to a particular slot). For instance, a header bit can be provided together with a 4-bit flit control field that can be used to designate such information as a virtual network of the flit, identify how the flit is to be encoded, among other examples. Additionally, error control functionality can be provided, such as through a 16-bit cyclic CRC field, among other potential examples.

A flit format can be defined so as to optimize throughput of messages on the Link layer. Some traditional protocols have utilized unslotted, smaller flits. For instance, in QPI an 80-bit flit was utilized. While the flit throughput of a larger (e.g., 192-bit flit) may be lower, message or packet throughput can be increased by optimizing use of the flit data. For instance, in some implementations of QPI, the entire 80-bit flit space was utilized regardless of the message size or type. By subdividing a larger flit into slots of predetermined lengths and fields, the 192 flit length can be optimized realizing higher efficiency even in instances when one or more of the available slots are sometimes unused. Indeed, Link layer traffic can be assumed to include many different types of messages and traffic, including messages and packets with varying header lengths and fields. The respective lengths and organization of slots defined in a flit can be defined so as to correspond with the statistical or expected frequency of various messages and the needs of these messages. For instance, two larger slots can be defined for every small slot, to accommodate an expected statistical frequency of messaging using these larger message types and header lengths, among other example. Further, flexibility can also be provided to further accommodate the varied traffic, such as through a floating payload field, as in the example of FIG. 6. In some instances, a flit format can be fixed, including the bits dedicated to particular slots in the flit.

In some implementations, a multi-slotted flit can apply principles such as those described in U.S. patent application Ser. No. 14/060,191, entitled "High Performance Interconnect," incorporated herein by reference in its entirety as if completely and fully set forth herein.

In the example of FIG. 6, a "Hdr" field can be provided for the flit generally and represent a header indication for the flit. In some instances, the Hdr field can indicate whether the flit is a header flit or a data flit. In data flits, the flit can still remain slotted, but omit or replace the use of certain fields with payload data. In some cases, data fields may include an opcode and payload data. In the case of header flits, a variety of header fields can be provided. In the example of FIG. 6, "Oc" fields can be provided for each slot, the Oc field representing an opcode. Similarly, one or more slots can have a corresponding "msg" field representing a message type of the corresponding packet to be included in the slot, provided the slot is designed to handle such packet types, etc. "DNID" fields can represent a Destination Node ID, a "TID" field can represent a transaction ID, a "RHTID" field can represent either a requestor node ID or a home tracker ID, among other potential fields. Further, one or more slots can be provided with payload fields.

In some implementations, flits can be characterized as header flits (e.g., bearing packet header data) or data flits (e.g., bearing packet payload data). Returning to FIG. 6, a flit format can be defined that includes three (3) distinct slots (e.g., 0, 1, and 2), allowing up to three headers to be transferred in a single flit (e.g., one header in each slot). Accordingly, each slot can have both control fields and a payload field. In addition to these, payload fields can be defined for each header (and slot). Further, a floating payload field can be defined that can be flexibly used as extra payload length for two or more of the slots (e.g., by either slot 0 or slot 1), based on the header types in these slots. The floating field can enable, in one implementation, 11 extra bits of payload for either Slot 0 or Slot 1. Note in implementations defining a larger flit more floating bits may be used and in smaller flits less floating bits may be provided. In some implementations, by allowing a field to float between the two slots, extra bits can be provided as needed for certain messages while still staying within a predefined flit length (e.g., 192 bits) and maximizing the utilization of the bandwidth. Additionally, a CRC field can be included within a flit to provide a CRC value for the flit.

A variety of high speed serial IO solutions have been developed and used, for instance, for inter-processor communication (e.g., QPI, KTI), processor-memory communications (e.g., Small Multimedia Interface (SMI)), as well as other bridged communications (e.g., PCIe, Serial ATA (SATA)). Packets transferred on serial channels can incur bit error(s) from time to time. These errors, however, can have catastrophic consequences if undetected. Errors can be detected efficiently by using a CRC checksum with the data packet. Packets with CRC errors can be dropped and higher level protocols can then initiate and try and get the packet transferred successfully, for instance, through retries. However, retries can have a substantial impact on performance. Further, where a particular one of the lanes of a link is marginalized or otherwise experiencing problems, bit errors can more frequently appear on this lane, causing a disproportionate number of CRC errors and retries. Traditionally, recurrent errors have caused an entire link to be retrained. However, if particular lanes of the link can be identified as "problem" lanes, these lanes can be isolated and retrained while the "good" lanes remain active, assisting with the reduction of bit errors and retry rates for the link while limiting the impact on link performance, among other example advantages.

Link layer logic of an agent can be used to generate the CRC value for a flit. The generated CRC value can be encoded in the CRC field of its corresponding flit. CRC values can be generated from a bit data mask representing the payload of the flit. The CRC value can be generated based on a particular polynomial. In one example, such as the example of FIG. 6, a 192 bit flit can include a 16 bit CRC field. Accordingly, 176 (non-CRC) bit data masks can be used with an XOR tree (based on the selected polynomial) to produce the 16 CRC bits. The flit can then be sent over a serial data link to a receiver. The Link layer logic of the receiver can apply the same polynomial used to generate the CRC value to the CRC value identified in the CRC field of a received flit. The receiver can generate a checksum from the CRC value and compare the result against the remaining, non-CRC flit data to determine whether any bit errors resulted from the transmission of the flit over the link. If an error exists on a lane, the checksum should produce a mismatched result, indicating one or more bit errors, among other examples. Additionally, in some implementations, the CRC code may be inverted after generation at the transmitter and inverted again before checking at the receiver, for instance, to prevent a flit of potentially all 0's or all 1's from passing the CRC check.

The accuracy of a CRC can be based on the length of the CRC value and the number of lanes utilized to send the flit. For instance, the potential error burst rate can increase as the number of lanes used in the link decreases. This can introduce additional complexity in HPI systems supporting partial width transmitting states, for instance. In some cases, the CRC polynomial can be designed based on the maximum total length of the block to be protected (data+CRC bits), the desired error protection features, and the type of resources for implementing the CRC, as well as the desired performance. In some examples, a CRC polynomial can be derived from either an irreducible polynomial or an irreducible polynomial times the factor to detect all errors affecting an odd number of bits. However, in some instances, choosing a reducible polynomial can result in missed errors, due to the rings having zero divisors, etc.

In one example implementation, a primitive polynomial can be utilized as the generator for a CRC code to provide a resulting CRC code with maximal total block length. For instance, if r is the degree of the primitive generator polynomial, then the maximum block length can be $(2^r-1)$, and the associated code can be able to detect any single-bit or double-bit errors. In another implementations, a generator polynomial $g(x)=p(x)(1+x)$ can be utilized, where $p(x)$ is a primitive polynomial of degree $(r-1)$, a maximum block length is $(2^{r-1}-1)$, and the resulting code able to detect single, double, and triple errors, among other examples.

A polynomial $g(x)$ that admits other factorizations may be utilized so as to balance the maximal total blocklength with a desired error detection power. For instance, Bose-Chaudhuri-Hocquenghem (BCH) codes are a powerful class of such polynomials. Regardless of the reducibility properties of a generator polynomial of degree r, if it includes the "+1" term, the code can be able to detect error patterns that are confined to a window of r contiguous bits. These patterns can be referred to as "error bursts". Such error bursts can result, for instance, when an error affects one of the lanes of a link.

In one particular example, a 192 bit flit can include a 16 bit CRC field. A 16 bit CRC polynomial can be implemented in Link layer logic to generate values of the CRC field. In one embodiment, the polynomial can permit detection of 1-bit, 2-bit, 3-bit, and 4-bit errors, detection of errors of burst length 16 or less, with only $1:2^{16}$ of all other error conditions going undetected.

As noted above, the error detection properties of a CRC can be based on the length of the CRC. For instance, in the case of a 16 bit CRC protecting a 192 bit flit, error detection can capture errors of burst length 16 or less. Such an implementation can effectively capture substantially all single-lane errors that could appear on a link employing 12 or more lanes to transmit the flit. However, for links or link states utilizing fewer lanes to transmit the flit, a 16 bit CRC can insufficient. For instance, a malfunction or error on a single lane of an 8 lane link can result in errors with burst lengths as high as 24 bits.

In some implementations, rolling CRC can be employed to extend the error detection properties provided through a flit format dedicating a fixed number of bits to a CRC. In one embodiment, a rolling CRC based on two or more CRC polynomials and two or more corresponding XOR trees can be provided (at least on some HPI-compliant devices). For a sequence of two or more flits, a first CRC code can be generated by the first polynomial for a first flit. For the second flit, the second CRC polynomial can be used to generate a second CRC code, and so on. The first CRC code generated by the first polynomial can be XORed with the second CRC code generated by the second polynomial to produce a rolling CRC value. The rolling CRC value can be provided to the receiver (e.g., in the CRC field of a flit). The rolling CRC value can reflect effectively multiple flits' worth of data improving the ability of the system to detect bit errors of higher burst lengths while no sacrificing additional payload for extra CRC bits, among other examples.

In order to increase the bandwidth many lanes of serial IO can be used in parallel. In such cases the data packet (or flit) with CRC can be striped across the lanes and transferred over a number of unit intervals (UI). (Set of bits transferred across the lanes in 1UI is termed phit). As an example, FIG. 8 shows a 192 bit KTI flit (16 bits of CRC) striped across 8 lanes and transferred as 24 phits in 24 UI. In this approach a CRC error would tell us that the flit is in error but in traditional solutions, the CRC error does not indicate which lane (or lanes) incurred the error. If the misbehaving lane can be identified, statistics can be collected and marginal lanes can be retrained or dropped (saving power). An alternative to CRC are error-correcting code (ECC) values. Like CRC, ECC can be used to detect bit errors, with bit errors resulting in an error checksum, or syndrome, at the receiver device. ECC logic can use the syndrome to identify and correct the bad bit and save the retry. ECC is traditionally used in memories (e.g., single error correction, double error detection, or SECDED) to address memory cells leaking charge and losing its value, which can sometimes be corrected using ECC. Using ECCs for communications has several drawbacks, however, including: performing equivalent error detection to CRC involves a checksum, which is longer and imposes a permanent tax on bandwidth; the calculations to identify bits in error are complex and hardware calculators consume power and may not be able to keep up with the IO at the higher data rates and lane widths; ECC codes that are capable of handling more than one bit in error (e.g., burst errors) become even more complex and are limited to correction of only certain failure modes, among other examples.

System, apparatus, and logic (implemented in hardware and/or software of one or more computing devices) described herein can address, at least partially, the issues identified above. In one implementation, one or more CRC polynomials can be identified, for a particular flit organization (e.g., flit size, bit ordering, etc.), that results in a set of CRC syndrome values being generated (in connection with computation of corresponding CRC errors) for at least each bit error affecting a given one of the bits in the flit. This can be used to identify, from the CRC syndrome, the specific bit that was in error. Further, through the defined bit ordering (and swizzling) of bits on respective lanes of a link, the specific lane on which the bit error occurred can thereby also be identified. Statistics can be collected and analyzed to identify trends of bit errors disproportionately affecting one or more particular lanes in the link in a statistically significant way. The lanes exhibiting these errors can then be electrically retrained (and/or dropped) to reduce these bit errors and retry rates resulting therefrom.

Figure 7:
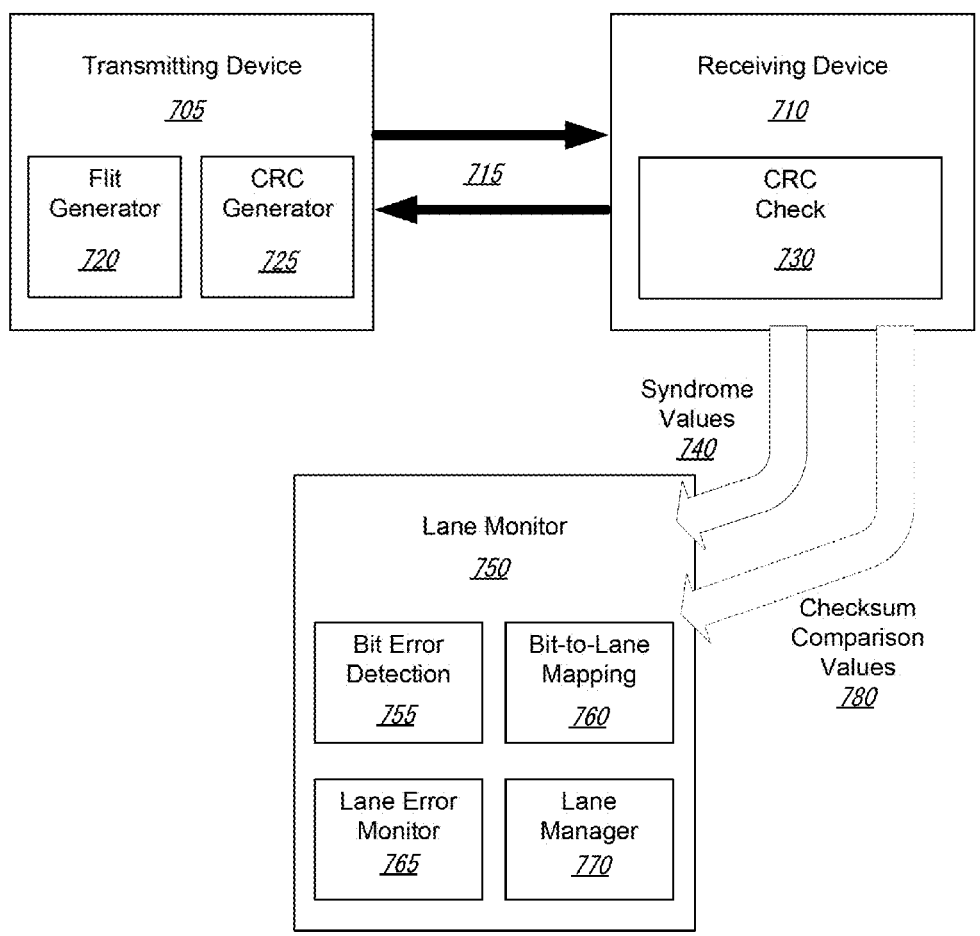
FIG. 7 illustrates a simplified block diagram of components utilized in error handling for one or more lanes of a link.

Turning to FIG. 7, a simplified block diagram 700 is shown representing components implemented in hardware and/or software that can be provided, in some instances, to identify problem lanes from CRC syndrome values identified during CRC error calculations. For example, a first device 705 can be a transmitting device in a particular transaction (or instance) and send data to a second, receiving device 710 over a serial link 715. (It should be appreciated that in other instances, device 710 can send data as the transmitting device over the link 715 to device 705, among other examples.) The first device 705 can include logic 720 to generate one or more flits for transmission across the link 715. A packet can comprise one or more flits. Each flit can include a CRC value calculated and encoded using a CRC generator 725. The flits can be sent over the link 715 to the second receiving device 710. The second device 710 can include logic to receive the flit and decode, or otherwise identify, the flit, including header values, slot values, and the CRC value (e.g., using CRC checking logic 730).

A receiving device can utilize a CRC value in a received flit to identify bit errors in the flit. In some implementations, the receiving device can regenerate the CRC from the remaining bits of the received flits and compare the regenerated CRC value with the received CRC value (e.g., using CRC checking logic 730) to determine bit errors. An error checksum (or residue or "syndrome") can be generated (e.g., using CRC checking logic 730) during the comparison in response to an error in the flit (and a mismatch between the regenerated CRC value and received CRC value). In some cases, a syndrome can be generated during regeneration of the CRC on the payload portion of the flit at the receiving device and the regenerated CRC can be compared against the received CRC value, for instance, through a bit-wise XOR comparison, with the value resulting from the comparison embodying the syndrome. In another example, a CRC can be performed at the receiving device on the entire flit (i.e., including the received CRC field), with the result of this operation embodying the syndrome. The syndrome can be generated at the receiver using hardware or firmware, or alternatively, the syndrome can be generated by software, such as software supervising operation of the receiver and link, among other potential implementations. In one specific implementation, a 16-bit syndrome value can be generated when errors are detected from a 16-bit CRC value. Other implementations can use other error residue values.

A syndrome value (e.g., 740) determined by the receiving device (e.g., by CRC checking logic 730) can be communicated or otherwise made available to a lane monitor module 750, implemented in hardware and/or software. The lane monitor 750 can include a bit error detection module 755 that includes logic to map a syndrome value to a particular bit (or multiple bits) in the flit. A CRC value can be generated from a CRC polynomial that is adapted to the flit's organization such that a unique syndrome value results from any given one of a set of errors (such as a set that includes any single bit error on any one of the bits of the flit, any single two bit error affecting any two consecutive bits of the flit, etc.). Accordingly, the bit error detection module 755 can determine, from the syndrome 740 one or more of the bits of the flit where the bit error occurred. The bit error detection module can also determine, from the syndrome, the type of error, such as a single bit error, two-bit error, etc.

In some instances, the bits of a flit can be transmitted in the same respective lane in multiple different flits. Accordingly, a mapping can be maintained and determined (e.g., using bit-to-lane mapping module 760) to map an error affecting a given bit to its respective lane of the link. In other cases, such as when the flit is transmitted during a partial width link state or during lane reversal conditions, mapping the detected bit affected by an error to the lane on which it was transmitted can be more involved. In some implementations, the lane error monitor 750 can receive additional data from the receiving device 710 (and/or transmitting device 705) or from other resources (e.g., registers corresponding to the link) that indicate the conditions of the corresponding lane when the flit was sent. Such additional information can include, for example, a physical layer flit swizzling phase number, physical layer link width indicator, an indicator showing whether lane reversal is used or not, etc. Using such information, the bit-to-lane mapping module 760 can determine the lanes used in the sending of a particular flit and thereby determine the bit ordering used during the transmission to determine the specific lane on which each flit bit was sent. In this manner, the bit-to-lane mapping module 760 can determine from the syndrome, for at least some bit errors, the lane on which the bit error occurred. The bit-to-lane mapping module 760 can record or report this information for a lane error monitor 765. The lane error monitor 765 can maintain records, a counter, or some other data that indicate, for each lane of a given link (e.g., 715) the number and frequency of errors detected on the lane (e.g., based on the reported link errors determined using bit error detection 755 and bit-to-lane mapping module 760.

In one example, lane error monitor 750 can maintain one or more tables to record bit errors determined on a lane-by-lane basis. A probabilistic decision algorithm can be utilized by the lane error monitor 765 to determine that a statistically significant number of bit errors are being detected on a given lane of a link during a period of time. The statistically significant value can be a threshold amount of errors determined over the period, can be a rate of errors exceeding a defined threshold error rate for the lane, among other examples. The algorithm can also take into account the amount of time the lane has been active (e.g., in an L0 state or remaining active during a partial width state, etc.), the number of bits that have been sent, among other factors in determining when errors are the lane exceed a threshold or other acceptable value. Based on identifying a statistically significant amount of bit errors appearing on a given lane, a lane error monitor 765 can determine that the lane is a marginal lane or that a lane likely is experiencing errors.

In some implementations, a receiving and transmitting device (e.g., devices 705, 710) can also maintain running checksum values on bits (e.g., lane parity) for each lane on a link (e.g., 715). Periodically, one of the devices can send its checksum to the other for comparison to identify, on a lane-by-lane basis, which lanes have experiences a bit error during the period. For instance, checksum values can be sent in specialized coordination state (e.g., L0c) or another link state, such as in an L0c code, debug flit, or other flit. In one example, a checksum value can be determined that includes a bit for each lane of the link. If no bit errors occurred during a period, each bit of the checksum value received from a device (e.g., 705) should match the checksum value for the other device (e.g., 710). The results (e.g., 780) of these comparisons can also be shared with a lane monitor 750 and used, together with other statistical values (e.g., obtained by the lane error monitor 765) to determine or confirm that a lane is operating marginally.

Checksum comparison values (e.g., 780) can also be used to improve the statistical understanding of results collected and monitored by the lane monitor 750 (e.g., to determine lane burst errors, among other examples). In other implementations, the devices 705, 710 can synchronously report their running checksum values directly to the lane monitor, allowing the lane monitor to perform the comparison, among other alternative implementations.

Upon determining that one or more lanes of a link are experiencing problems, based on statistically significant numbers of bit errors determined for the lane from syndrome values 740 and/or checksum comparison values 780, a lane manager 770 can be invoked to perform actions on the lane(s) to attempt to correct the issue. For instance, a lane determined to be "bad" can be dropped from the link for a time and can be retrained to allow the devices (e.g., 705, 710) on the link 715 to re-adapt to the new environmental conditions that are most likely the cause of the bit errors. In some cases a partial width state can be entered in which at least the "bad" lane (together with possibly other good lanes) is brought offline and retrained. The lanes can also be dropped for longer periods in some determined conditions. While the flit rate may be compromised in such instances, good lanes can remain in use and their integrity preserved (e.g., through the CRC and continued monitoring of newly emergent "bad" lanes in the remaining "good" set of lanes), among other examples.

Additional logic can also be provided. For instance, devices 705, 710 can include logic for bit error handling. For instance, upon identifying a bit error from the CRC value, a retry of the flit can be initiated. Additionally the retried flit can be compared (e.g., by device 710 or lane monitor 750) to the flit in error to identify additional statistics that can be considered by the lane error monitor 765 to identify bad bits/lanes. While the devices 705, 710 may not be able to determine the bit or lane on which the bit error occurred, their rudimentary handling of the error (e.g., through retries) can still guard against lane or bits-specific error detection being a bottleneck within the system. Software utilities (e.g., 750) separate from or above the devices 705, 710 can perform this detection in the background and cause problem lanes to be dropped or retrained so that repeated retries caused by a bad lane are minimized.

As noted above, in some implementations, link width can vary during the life of the link. For instance, the Physical layer can transition between link width states, such as to and from a full or original lane width and a different or partial lane width. For example, in some implementations, a link can be initialized to transfer data over 20 lanes. Later, the link can transition to a partial width transmitting state where only 8 lanes (or another amount of lanes) are actively used, among many other potential examples. Such lane width transitions can be utilized, for instance, in connection with power management tasks governed by one or more power control units (PCU) among other examples.

As noted above, link width can influence flit throughput rate. FIG. 8 is a representation of an example 192-bit flit sent over an 8 lane link, resulting in throughput of the flit at 24UI. Further, as shown in the example of FIG. 8, bits of the flit can be sent out of order in some instances, for example, to send more time-sensitive fields earlier in the transfer (e.g., flit type fields (e.g., data or header flit), opcodes, etc.), preserve or facilitate particular error detection or other functionality embodied in the flit, among other examples. For instance, in the example of FIG. 8, bits 191, 167, 143, 119, 95, 71, 47, and 23 are sent in parallel on lanes L7 through L0 during a first UI (i.e., UI0) of transfer, while bits 168, 144, 120, 96, 72, 48, 24, and 0 are sent during the 24$^{th}$ (or final) UI of the flit transfer (i.e., UI23). It should be appreciated that other ordering schemes, flit lengths, lane widths, etc. can be utilized in other implementations and examples.

In some instances, the length of the flit can be a multiple of the number of active lanes. In such instances, the flit can be transmitted evenly on all active lanes and transfer of the flit can end substantially simultaneously at a clean (i.e., non-overlapping) boundary. For example, as shown in the representation of FIG. 9, bits of a flit can be considered to be transmitted in consecutive groupings of 4 bits, or "nibbles." In this example, a 192 bit flit is to be transferred over an 8 lane link. As 192 is a multiple of 8, the entire flit can be cleanly transferred over the 8 lane link in 24 UI. In other instances, the flit width may not be a multiple of the number of active lanes. For instance, FIG. 10 shows another representation of an example 192 bit transferred over 20 lanes. As 192 is not evenly divisible by 20, transfer of the full flit would require a non-integer number of intervals (e.g., 9.6 UI). In such cases, rather than wasting "extra" lanes not utilized during the 10th UI of transfer, a second overlapping flit can be transferred with the final bits of a preceding flit. Such overlapping, or swizzling, of the flits can result in jagged flit boundaries and flit bits sent out of order in some implementations. The pattern utilized for the transfer can be configured to allow more time-sensitive fields of the flit to be transferred earlier in the flit, preservation of error detection and correction, among other considerations. Logic can be provided in one or both of the Physical and Link layers to transfer flit bits according to such patterns and dynamically change between patterns based on the current link width. Further logic can be provided to re-order and re-construct flits from such swizzled or ordered bit streams, among other examples. A bit-to-lane mapping can be aware of changes to the number of active lanes in a link and can be further aware of swizzling patterns utilized in various link widths (i.e., lane counts). Accordingly, the bit-to-lane mapping can use this information to determine, for any flit sent in a given set of UIs on a given number of lanes, which bit of the flit was sent on which of the active lanes of the link.

In accordance with the above, on flit errors, the current flit mapping can be saved or otherwise made identifiable to bit-to-lane mapping logic. This state can be saved along with the syndrome to allow software (e.g., bit-to-lane mapping logic) to decode the lane location of the error. A set of possible flit mappings can be defined for use on a link. For instance, as shown in FIG. 11, a table 1100 is shown representing at least a portion of various flit mappings that might be employed for 20 and 8 lane link widths with or without lane reversal applied. Additionally, as shown in table 1100, the phit format (or swizzle table for dynamic packing) can also be considered in determining the correct mapping, as the phit format table is a function of lane reversal as well as other static (e.g., failover) and dynamic configuration (e.g., L0p) as well as for ×20 (rotating) and ×8 (non-rotating) configurations, among other factors.

Turning to FIGS. 12-1 and 12-2, a representation is shown of a mapping of syndrome values calculated from CRC values resulting from single bit errors in a flit. Such a mapping can be implemented in a syndrome decoder table that can be used to decode the lane on which a given bit error occurred. As the example maps single bits errors to lanes in a flit that includes 192 bits, the mapping 1200 can include 192 entries. A unique syndrome value can exist for each possible single bit error in the flit. As an example, a syndrome value of 0xd95 can always result, in this implementation, when a single bit error affects bit 178 of the flit. Achieving such a mapping can be accomplished by determining and using a particular CRC polynomial adapted to generate such unique values for the particular the flit layout (and phit formats). For instance, in the example of FIGS. 12-1 and 12-2, the CRC polynomial selected to generate a 16-bit CRC is: $x^{16}+x^{15}+x^{13}+x^{12}+x^{10}+x^9+x^8+x^7+x^6+x^4+x^3+x^1+1$. Multiple other CRC polynomials may also exist for a given flit format that allows for unique single-bit CRC syndrome values for each single bit error in the flit. Software can be used to test combination of bit errors that might emerge for a given flit format and further determine, for a series of different candidate CRC polynomials, which polynomials resulted in CRC syndrome values that were unique for each different bit error.

Turning to FIGS. 13-1 and 13-2, a second syndrome decoder table 1300 is shown that corresponds to an example 192-bit flit and corresponding CRC generated from an example CRC polynomial $x^{16}+x^{15}+x^{13}+x^{12}+x^{10}+x^9+x^8+x^7+x^6+x^4+x^3+x^1+1$. Syndrome decoder table 1300, rather than mapping to single bit errors, maps syndromes to the complete set of two-bit errors (i.e., consecutive bit errors) that might appear on the 192 bit flit (i.e., having a particular organization). Accordingly, in some implementations, a CRC polynomial can be selected and used that results in unique CRC syndrome values not only for each possible single bit error on a flit, but also for all possible two-bit errors, among other examples. Naturally, it should be appreciated that the examples shown in FIGS. 12-1, 12-2, 13-1, 13-2 are specific to an example implementation that is to provide a 16-bit CRC value for a 192-bit flit. These same principles, however, can be applied to flits of different lengths with CRC values of differing sizes. Further, it should be appreciated that some CRC polynomials may result in unique detection of other bit-specific errors in addition to (or as an alternative to) single-bit and two-bit errors, such as three-bit errors and other examples.

A mapping of bit errors to one or more flit bits, such as implemented through a syndrome decoder table, can be used to map the bit errors to one or more respective lanes used to send the corresponding flit affected by the bit error(s). For instance, a syndrome can be received (e.g., from a particular device involved) in a corresponding transaction in which a corresponding bit error was determined from the CRC value of a flit of the transaction. A lane monitor can determine whether the syndrome value is included in one of a set of syndrome decoder tables (e.g., 1200, 1300). If it is, the proper syndrome decoder table can be used to identify the bit number within the flit that is in error (as well as if multiple bits were in error). If the syndrome is not included in an available syndrome decoder table, the error may not be able to be mapped to particular bits or lanes (e.g., in instances where multiple, non-contiguous bit errors affect the flit). In cases, where a table is identified that includes the syndrome value, one or more specific bits can be identified as affected by the error and a bit-to-lane mapping can then be determined for the identified bit(s) that are in error to determine that the bit in error was sent on a given one of a plurality of lanes on a link of an interconnect. The lane number can be decoded, for instance, by first determining whether the link was operating in full or partial width at the time of the error, determining which swizzling phase was applied (when applicable), and whether lane reversal was applied.

Figure 14A:
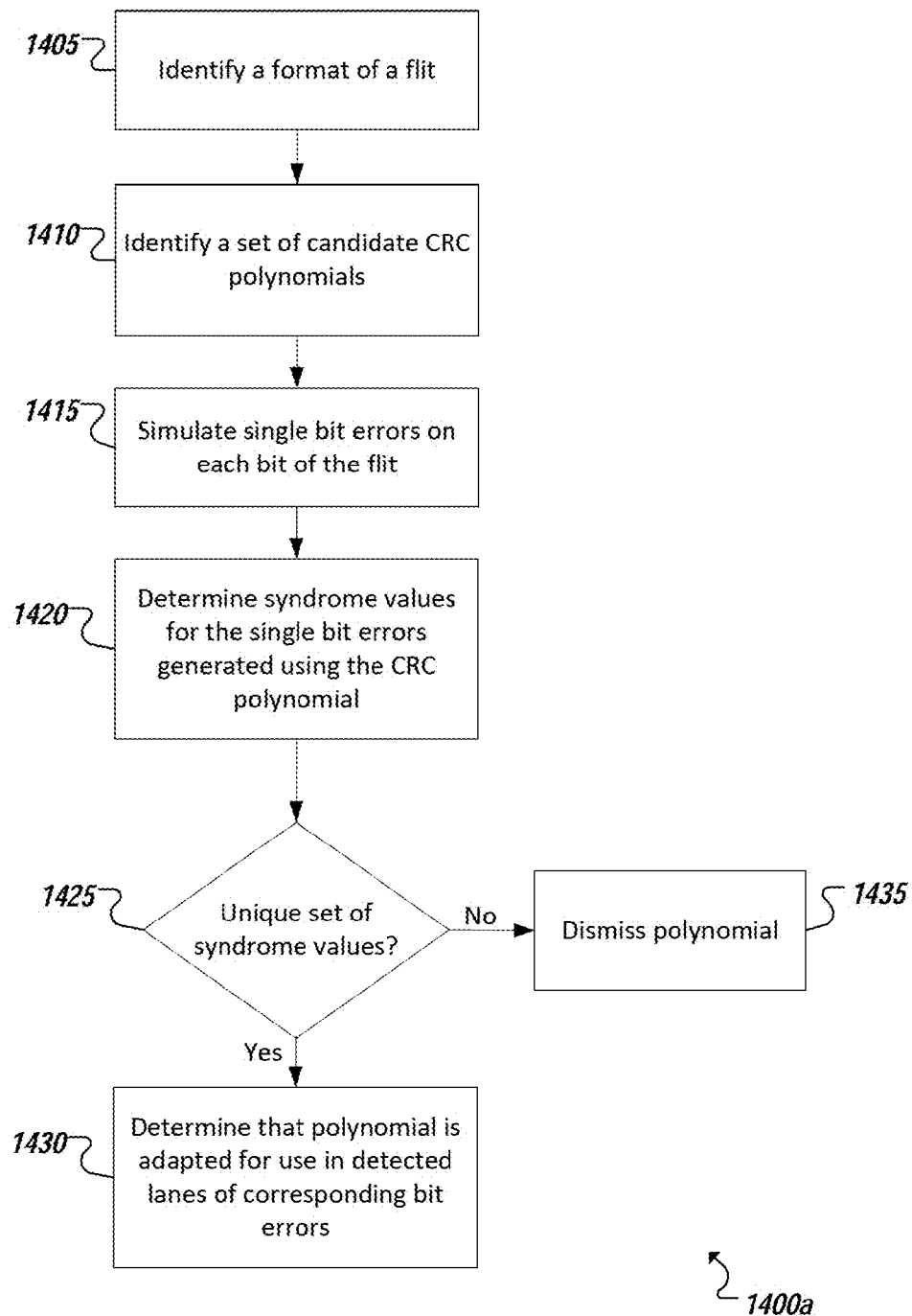
FIGS. 14A-14B are flowcharts illustrating example techniques for use in mapping lanes to bit errors on a link.
Figure 14B:
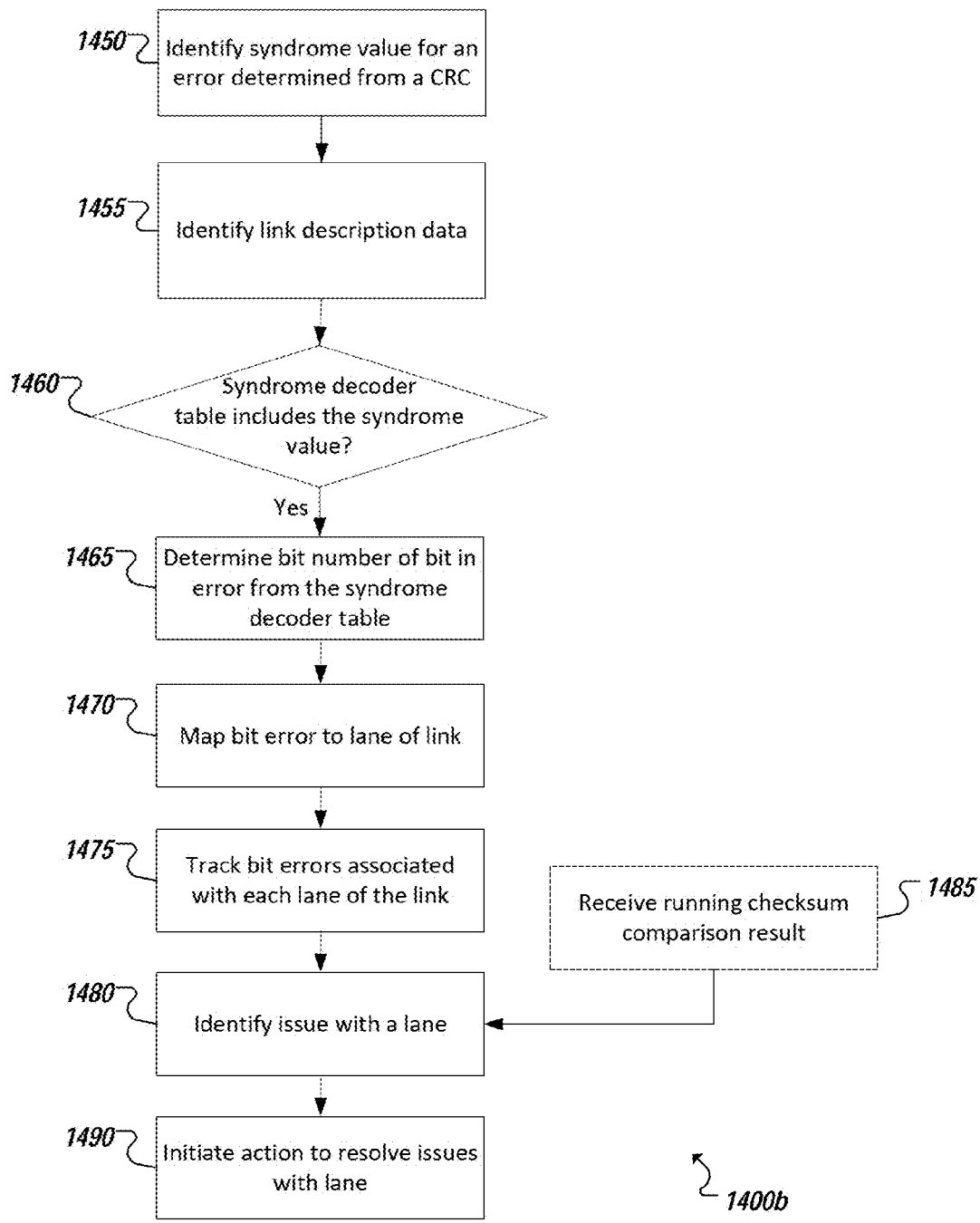

Turning to FIGS. 14A-14B are flowcharts 1400a-b illustrating techniques relating to determining lane numbers associated with bit errors detected in flits through a CRC value. In the example of FIG. 14A, a flowchart 1400a shows a technique for determining a CRC polynomial adapted to provide unique CRC syndromes associated with bit-specific errors in a flit. Data describing a format of a flit can be identified 1405 including attributes of the flit such as its length, the size of the CRC to be employed in the flit, underlying phit characteristics, etc. A set of candidate CRC polynomials can also be identified 1410. For each of the CRC polynomials, single bit errors for each bit of the flit can be simulated 1415 to determine 1420 corresponding CRC syndrome values for each of the bit errors. The results can be assessed 1425 to determine whether each bit error's syndrome value is unique for CRC values calculated from the CRC polynomial. If this is the case, the CRC polynomial can be determined 1430 to be polynomial capable of being used in determining the mapping of a lane to the single bit errors. Otherwise, the polynomial can be dismissed 1435 for consideration. A software program can be implemented to organize and perform the calculations, as well as assess the arrays of CRC syndrome values generated from each CRC polynomial.

In the example of FIG. 14B, a syndrome value is identified 1450 that corresponds to a bit error detected in a flit (e.g., from a CRC value of the flit). The syndrome value can be calculated, in some instances, together with the calculation of the CRC value by the device receiving the flit over a link. In other instances, identification 1450 of the syndrome value can include calculation of the syndrome value corresponding to the detected bit error. Link description data can also be identified 1455 that describes conditions of the link at the time the bit error was detected. Such conditions can include the width of the link, the swizzling phase (if any) applied, whether lane reversal was applied, etc. A set of one or more syndrome decoder tables can be identified that define mappings of flit bit numbers to particular possible syndrome values. A first table can correspond to single bit errors that can appear in the flit. A second table can correspond to two-bit errors, among other examples. The set of tables can be searched to determine 1460 whether the received syndrome value is included in any of the set of tables. If a table is identified, the bit number(s) of the bit(s) in error of the flit can be determined 1465. The link description data can be used to map 1470 the bit error to a lane of the link used to send the flit. The bit error can then be associated with the lane. Bit errors for the link can be tracked 1475 on a lane-by-lane basis to identify 1480 issues with one or more lanes, based on statistically significant amounts of bit errors being detected on the lane. Additional information can be considered in some implementations. For instance, running checksums can be maintained by the transmitting and receiving devices for each lane of the link and a periodic comparison of the checksums can be performed. In some cases, the results of the comparison can be received 1485 and considered together with the lane-by-lane bit error data to determine, or corroborate, issues with specific lanes of the link. Action can be initiated 1490 to cure issues with such error-prone lanes.

Figure 15:
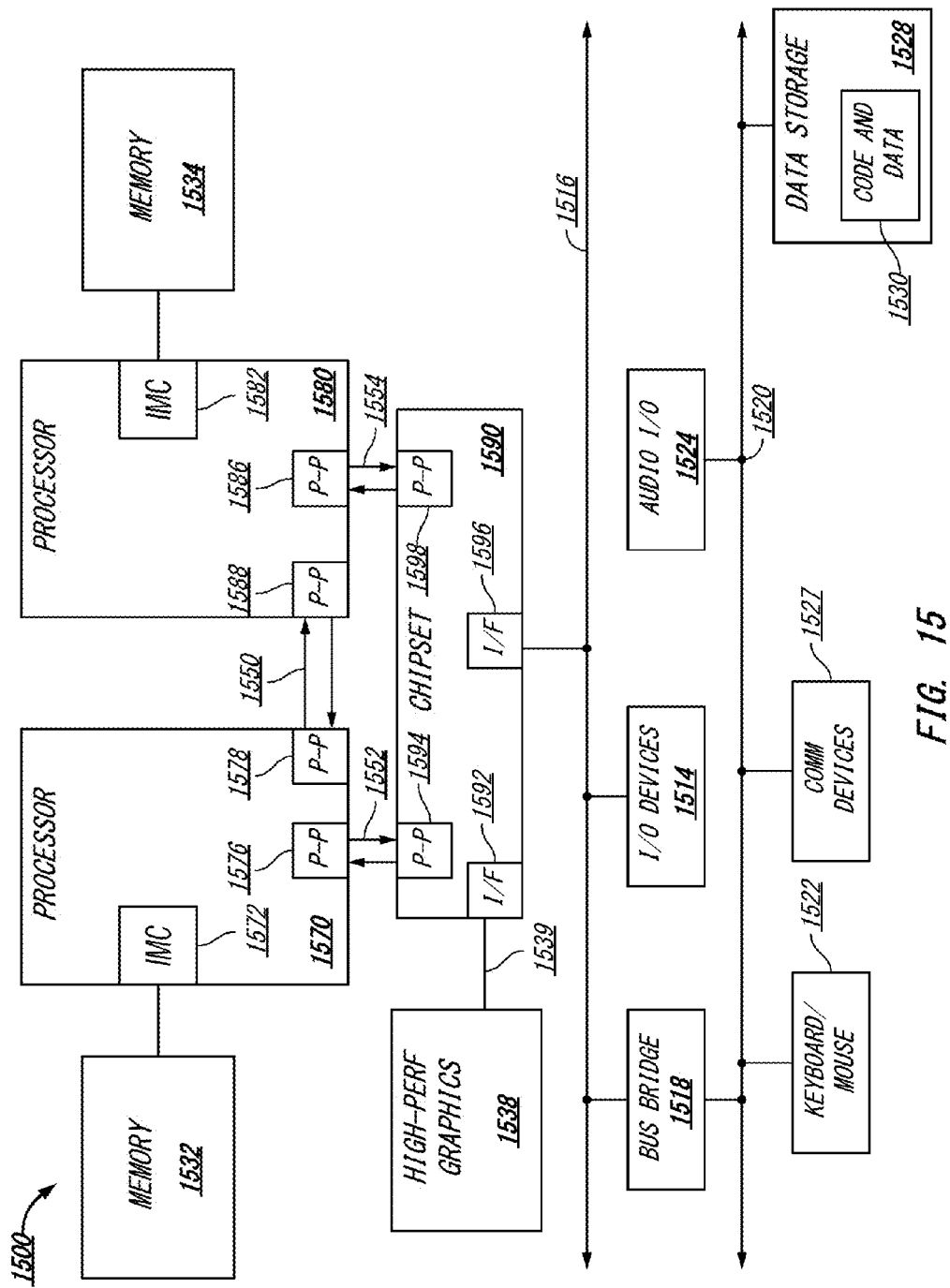
FIG. 15 illustrates an embodiment of a block for an example computing system.

HPI can incorporated in any variety of computing devices and systems, including mainframes, server systems, personal computers, mobile computers (such as tablets, smartphones, personal digital systems, etc.), smart appliances, gaming or entertainment consoles and set top boxes, among other examples. For instance, FIG. 15 illustrates an example computer system 1500 in accordance with some implementations. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of a processor. In one embodiment, 1552 and 1554 are part of a serial, point-to-point coherent interconnect fabric, such as a high-performance architecture. As a result, the invention may be implemented within the QPI architecture.

While shown with only two processors 1570, 1580, it is to be understood that the scope of the present invention is not so limited. In other embodiments, one or more additional processors may be present in a given processor.

Processors 1570 and 1580 are shown including integrated memory controller units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 each exchange information with a chipset 1590 via individual P-P interfaces 1552, 1554 using point to point interface circuits 1576, 1594, 1586, 1598.

Chipset 1590 also exchanges information with a high-performance graphics circuit 1538 via an interface circuit 1592 along a high-performance graphics interconnect 1539.

A shared cache (not shown) may be included in either processor or outside of both processors; yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 are coupled to first bus 1516, along with a bus bridge 1518 which couples first bus 1516 to a second bus 1520. In one embodiment, second bus 1520 includes a low pin count (LPC) bus. Various devices are coupled to second bus 1520 including, for example, a keyboard and/or mouse 1522, communication devices 1527 and a storage unit 1528 such as a disk drive or other mass storage device which often includes instructions/code and data 1530, in one embodiment. Further, an audio I/O 1524 is shown coupled to second bus 1520. Note that other architectures are possible, where the included components and interconnect architectures vary. For example, instead of the point-to-point architecture of FIG. 15, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

One or more embodiments may provide an apparatus, a system, a machine readable storage, a machine readable medium, hardware- and/or software-based logic (e.g., a lane monitor), and a method to determine that a bit error in a flit transmitted over a link affected one or more particular bits of the flit using a syndrome value associated with a cyclic redundancy check (CRC) value of the flit, where the link includes a plurality of lanes; determine that the one or more particular bits were sent over one or more particular lanes of the link; and associate the bit error with the one or more particular lanes.

In at least one example, a problem with the particular lane is determined based on determining an amount of bit errors associated with the particular lane, and the amount includes the bit error associated with the particular lane.

In at least one example, the lane monitor is further to initiate an action on the particular lane based on determining the problem.

In at least one example, the action includes retraining the particular lane.

In at least one example, the action includes changing the particular lane to an inactive state.

In at least one example, the inactive state includes a partial width link state and at least one other lane of the link is to remain active during the partial width link state.

In at least one example, the flit is transmitted between first and second devices and the lane monitor is to receive data that describes results of a periodic comparison of running checksum values at each of the first and second devices.

In at least one example, the data describes a checksum comparison that indicates at least one bit error on the particular lane and the problem is further determined based on the data.

In at least one example, the amount is a statistically significant amount over a period of time.

In at least one example, the bit error is one of a single-bit error and a two-bit error.

In at least one example, the flit includes a 192 bit flit with three defined slots and a CRC field encoded with the CRC value, where the CRC value is 16 bits in length.

In at least one example, the flit is according to a predefined format and the CRC value is generated from a polynomial operable to at least result in unique syndrome values for each possible single-bit error in the flit.

In at least one example, the flit is transmitted between first and second devices and the lane monitor is to receive data from at least one of the first and second devices and use the data to determine that the bit error affected the one or more particular bits.

In at least one example, the lane monitor is to further use the data to determine a mapping of bits to lanes of the link and the lane monitor is to use the mapping to determine that the one or more particular bits were sent over one or more particular lanes of the link.

In at least one example, the flit is a particular one of a plurality of flits to be sent over the link, each of the plurality of flits are according to a defined format, a particular bit in the particular flit is to be sent on the particular lane, and the particular bit in another one of the plurality of flits is to be sent on a different one of the plurality of lanes of the link.

In at least one example, the mapping is a particular one of a plurality of potential mappings of bits to lanes of the link and the data is to be used to identify that the particular mapping is to be used for the particular flit.

In at least one example, the flit is to be retried based on the bit error.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
    a lane monitor to:
        determine a syndrome value from a cyclic redundancy check (CRC) value of a flit transmitted over a link comprising a plurality of lanes, wherein the flit is according to a defined flit format;
        determine a bit error in the flit from the CRC value;
        determine from the syndrome value that the bit error comprises an error in one or more particular bits of the flit based on a mapping of syndrome values to bits of the flit format;
        determine that the one or more particular bits were sent over at least one particular lane of the link; and
        associate the bit error with the particular lane.

2. The apparatus of claim 1, wherein the lane monitor is further to determine a problem with the particular lane based on determining an amount of bit errors associated with the particular lane, wherein the amount includes the bit error associated with the particular lane.

3. The apparatus of claim 2, wherein the lane monitor is further to initiate an action on the particular lane based on determining the problem.

4. The apparatus of claim 3, wherein the action comprises retraining the particular lane.

5. The apparatus of claim 3, wherein the action comprises changing the particular lane to an inactive state.

6. The apparatus of claim 5, wherein the inactive state comprises a partial width link state and at least one other lane of the link is to remain active during the partial width link state.

7. The apparatus of claim 2, wherein the flit is transmitted between first and second devices and the lane monitor is to receive data that describes results of a periodic comparison of running checksum values at each of the first and second devices.

8. The apparatus of claim 7, wherein the data describes a checksum comparison that indicates at least one bit error on the particular lane and the problem is further determined based on the data.

9. The apparatus of claim 2, wherein the amount comprises is greater than or equal to a statistically significant amount over a period of time.

10. The apparatus of claim 1, wherein the bit error comprises one of a single-bit error and a two-bit error.

11. The apparatus of claim 1, wherein the flit format defines a 192 bit flit with three defined slots and a CRC field encoded with the CRC value, wherein the CRC value comprises 16 bits.

12. The apparatus of claim 1, wherein the CRC value is generated from a polynomial operable to at least result in unique syndrome values for each possible single-bit error in the flit.

13. The apparatus of claim 1, wherein the flit is transmitted between first and second devices and the lane monitor is to receive data from at least one of the first and second devices and use the data to determine that the bit error affected the one or more particular bits.

14. The apparatus of claim 13, wherein the lane monitor is to further use the data to determine a mapping of bits to lanes of the link and the lane monitor is to use the mapping to determine that the one or more particular bits were sent over one or more particular lanes of the link.

15. The apparatus of claim 14, wherein the flit is a particular flit a plurality of flits to be sent over the link, each of the plurality of flits are according to the defined flit format, a particular bit in the particular flit is to be sent on the particular lane, and the particular bit in another one of the plurality of flits is to be sent on a different one of the plurality lanes of the link.

16. The apparatus of claim 15, wherein the mapping is a particular one of a plurality of potential mappings of bits to lanes of the link and the data is to be used to identify that the particular mapping is to be used for the particular flit.

17. The apparatus of claim 1, wherein the flit is to be retried based on the bit error.

18. A method comprising:
    determining a syndrome value from a cyclic redundancy check (CRC) value of a flit transmitted over a link comprising a plurality of lanes, wherein the flit is according to a defined flit format;
    determining a bit error in the flit from the CRC value;
    determining from the syndrome value that the bit error comprises an error in one or more particular bits of the flit based on a mapping of syndrome values to bits of the flit format;
    determining that the one or more particular bits were sent over at least one particular lane of the link; and
    associating the bit error with the particular lane.

19. At least one non-transitory machine accessible storage medium having code stored thereon, the code when executed on a machine, causes the machine to:
    determine a syndrome value from a cyclic redundancy check (CRC) value of a flit transmitted over a link comprising a plurality of lanes, wherein the flit is according to a defined flit format;
    determine a bit error in the flit from the CRC value;
    determine from the syndrome value that the bit error comprises an error in one or more particular bits of the flit based on a mapping of syndrome values to bits of the flit format;
    determine that the one or more particular bits were sent over at least one particular lane of the link; and
    associate the bit error with the particular lane.

20. A system comprising:
    an interconnect comprising one or more links;
    a first device;
    a second device connected to the first device by a particular one of the links, wherein the particular link comprises a plurality of lanes; and
    a lane monitor to:
        receive a particular cyclic redundancy check (CRC) syndrome value associated with a bit error of a flit sent from the first device to the second device over the particular link, wherein the particular CRC syndrome value is generated from a CRC value included in the flit, and the flit is according to a defined flit format;
        determine that the particular CRC syndrome value indicates that the bit error affected one or more particular bits of the flit from a mapping of CRC syndrome values to bits of the flit format;
        determine that the one or more particular bits were sent over one or more particular lanes of the particular link; and
        associate the bit error with the one or more particular lanes.

* * * * *

UNITED STATES PATENT AND TRADEMARK OFFICE
CERTIFICATE OF CORRECTION

PATENT NO. : 9,552,253 B2  
APPLICATION NO. : 14/495797  
DATED : January 24, 2017  
INVENTOR(S) : Venkatraman Iyer, Robert G. Blankenship and Debendra Das Sharma Page 1 of 1

It is certified that error appears in the above-identified patent and that said Letters Patent is hereby corrected as shown below:

In the Claims

In Column 25, Line 65, in Claim 15, after "flit" insert -- in --.

Signed and Sealed this  
Thirtieth Day of May, 2017

Michelle K. Lee  
*Director of the United States Patent and Trademark Office*